United States Patent
Gschwind et al.

(10) Patent No.: US 10,936,314 B2
(45) Date of Patent: *Mar. 2, 2021

(54) SUPPRESSING BRANCH PREDICTION ON A REPEATED EXECUTION OF AN ABORTED TRANSACTION

(71) Applicant: INTERNATIONAL BUSINESS MACHINES CORPORATION, Armonk, NY (US)

(72) Inventors: Michael K. Gschwind, Chappaqua, NY (US); Valentina Salapura, Chappaqua, NY (US); Chung-Lung Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/379,298

(22) Filed: Apr. 9, 2019

(65) Prior Publication Data
US 2019/0235869 A1   Aug. 1, 2019

Related U.S. Application Data

(63) Continuation of application No. 14/293,234, filed on Jun. 2, 2014, now Pat. No. 10,289,414.

(51) Int. Cl.
| | |
|---|---|
| *G06F 9/38* | (2018.01) |
| *G06F 9/52* | (2006.01) |
| *G06F 9/30* | (2018.01) |
| *G06F 9/46* | (2006.01) |

(52) U.S. Cl.
CPC ...... *G06F 9/30058* (2013.01); *G06F 9/30087* (2013.01); *G06F 9/3834* (2013.01); *G06F 9/3844* (2013.01); *G06F 9/3861* (2013.01); *G06F 9/467* (2013.01); *G06F 9/528* (2013.01)

(58) Field of Classification Search
CPC ..... G06F 9/30087; G06F 9/3842; G06F 9/528
See application file for complete search history.

(56) References Cited

U.S. PATENT DOCUMENTS

| | | | |
|---|---|---|---|
| 7,703,098 B1 | 4/2010 | Moir et al. | |
| 8,171,262 B2 | 5/2012 | Jeppesen et al. | |
| 8,473,724 B1 | 6/2013 | Kenville | |
| 9,477,469 B2 | 10/2016 | Gschwind et al. | |
| 9,830,159 B2 | 11/2017 | Gschwind et al. | |
| 10,235,172 B2 | 3/2019 | Gschwind et al. | |
| 10,261,826 B2 | 4/2019 | Gschwind et al. | |
| 10,289,414 B2 | 5/2019 | Gschwind et al. | |
| 2004/0139281 A1 | 7/2004 | McDonald | |

(Continued)

OTHER PUBLICATIONS z/Architecture—Principles of Operation, 10th Edition, SA22-7832-09, Sep. 2012, pp. 5-1 thru 521, 5-68, 5-87 thru 5-106, 6-42 thru 6-43, 7-33 thru 7-45, 7-328 thru 7-336, 10-5 thru 10-16 (+ cover sheets).

(Continued)

*Primary Examiner* — Jacob Petranek
(74) *Attorney, Agent, or Firm* — Steven Chiu, Esq.; Blanche E. Schiller, Esq.; Heslin Rothenberg Farley & Mesiti P.C.

(57) ABSTRACT

Branch prediction is suppressed for branch instructions executing in a transaction of a transactional memory (TM) environment in transactions that are re-executions of previously aborted transactions.

8 Claims, 17 Drawing Sheets

(56) References Cited

U.S. PATENT DOCUMENTS

| | | |
|---|---|---|
| 2005/0223200 A1 | 10/2005 | Tremblay et al. |
| 2006/0190710 A1 | 8/2006 | Rychlik |
| 2007/0239974 A1 | 10/2007 | Park, II et al. |
| 2008/0162908 A1 | 7/2008 | Luick |
| 2010/0169623 A1 | 7/2010 | Dice |
| 2011/0119528 A1 | 5/2011 | Karlsson et al. |
| 2012/0227045 A1 | 9/2012 | Knauth et al. |
| 2012/0290820 A1 | 11/2012 | Olson et al. |
| 2013/0191825 A1 | 7/2013 | Muff et al. |
| 2013/0198499 A1 | 8/2013 | Dice et al. |
| 2013/0339327 A1 | 12/2013 | Belmar et al. |
| 2013/0339703 A1 | 12/2013 | Alexander et al. |
| 2013/0339967 A1 | 12/2013 | Greiner et al. |
| 2014/0201508 A1 | 7/2014 | Busaba et al. |
| 2015/0301832 A1 | 10/2015 | Zhang et al. |
| 2015/0347134 A1 | 12/2015 | Gschwind et al. |
| 2015/0347135 A1 | 12/2015 | Gschwind et al. |
| 2015/0347136 A1 | 12/2015 | Gschwind et al. |
| 2015/0347137 A1 | 12/2015 | Gschwind et al. |
| 2019/0227839 A1 | 7/2019 | Gschwind et al. |
| 2019/0332417 A1 | 10/2019 | Gschwind et al. |

OTHER PUBLICATIONS

Gschwind, Michael et al., "Delaying Branch Prediction Updates Until After a Transaction Is Completed," U.S. Appl. No. 16/507,719, filed Jul. 10, 2019, pp. 1-73.

List of IBM Patents or Patent Applications Treated as Related, Oct. 14, 2019, pp. 1-2.

Gschwind, Michael K. et al., "Suppressing Branch Prediction Updates Upon Repeated Execution of an Aborted Transaction Until Forward Progress is Made," U.S. Appl. No. 16/371,760, filed Apr. 1, 2019, pp. 1-84.

List of IBM Patents or Patent Applications Treated as Related, Apr. 24, 2019, pp. 1-2.

Intel Architecture Instruction Set Extensions Programming Reference, 319433-012A, Feb. 2012, pp. i-xii, 1-1 to 8-25 and A1-to 1-6.

Jacobi et al., "Transactional Memory Architecture and Implementation for IBM System z", 2012 IEEE/ACM 45$^{th}$ Annual International Symposium on Microarchitecture, Dec. 2012, pp. 25-36.

Mak et al., "IBM System z10 Processor Cache Subsystem Microarchitecture", IBM Journal of Research and Development, vol. 53, No. 1, Paper 2, 2009, pp. 1-12.

McDonald, Austen, "Architectures for Transactional Memory", A Dissertation submitted to the Department of Computer Science and the Committee on Graduate Studies of Stanford University, Jun. 2009, pp. i-xvi and 1-145.

Tendler et al., "POWER4 System Architecture", IBM Journal of Research and Development, vol. 46, No. 1, Jan. 2002, pp. 5-25.

z/Architecture—Principles of Operation, 10$^{th}$ Edition, SA22-7832-09, Sep. 2012, pp. i-xl, 1-1 to 20-58 and A-1 to X-59.

Armejach, A., et al., "HARP—Adaptive Abort Recurrence Prediction for Hardware Transactional Memory," 20$^{th}$ International Conference on High Performance Computing (HiPC), Dec. 2013, pp. 1-10.

Atoofian, Ehsan et al., "Boosting Performance of Transactional Memory Through—OGEHL Predictors," Sep. 2013 (Abstract only—1 page).

Intel Architecture Instruction Set Extensions Programming Reference, 319433-012A, Feb. 2012, pp. 1-5 thru 17, 2-40, 2-49, 2-53, 2-59, 8-1 thru 8-24 (+ cover pages).

McDonald, Austen, "Architectures for Transactional Memory", A Dissertation submitted to the Department of Computer Science and the Committee on Graduate Studies of Stanford University, Jun. 2009, pp. i-ii, 1-5, 7-11, 72-99, 105-114.

z/Architecture—Principles of Operation, 10$^{th}$ Edition, SA22-7832-09, Sep. 2012, pp. 1-1 thru 1-30, 4-1 thru 4-40, 5-1 thru 5-21, 5-68 thru 5-106, 6-42 thru 6-43, 7-33 thru 7-45, 7-328 thru 7-336, 10-1 thru 10-16 (+ cover sheets).

Sanyal, Sutirtha et al., "Clock Gate on Abort: Towards Energy-Efficient Hardware Transactional Memory," Apr. 2009, pp. 1-8.

List of IBM Patents or Patent Applications Treated as Related, Apr. 17, 2019, pp. 1-2.

SUPPRESSING BRANCH PREDICTION ON A REPEATED EXECUTION OF AN ABORTED TRANSACTION

This application is a continuation of co-pending U.S. patent application Ser. No. 14/293,234, filed Jun. 2, 2014, entitled "SUPPRESSING BRANCH PREDICTION ON A REPEATED EXECUTION OF AN ABORTED TRANSACTION," which is hereby incorporated herein by reference in its entirety.

BACKGROUND

The present invention is related to transactional memory on a computer system, and more specifically to controlling branch prediction.

Over the years, the number of central processing unit (CPU) cores on a chip and the number of CPU cores connected to a shared memory have grown significantly to support growing workload capacity demand. For example, the IBM zEC12 enterprise server supports operating system images with up to 101 CPUs. The increasing number of CPUs cooperating to process the same workloads puts significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU's frequency, the latency of hardware interconnects is limited by the physical dimension of the chips and systems, and by the speed of light.

IBM Corporation and Intel Corporation have each recently introduced implementations of hardware Transactional Memory wherein a group of instructions called a transaction is operating atomically and in isolation (sometimes called "serializability") on a data structure in memory. The transaction executes optimistically without obtaining a lock, but may need to abort and retry if the operation conflicts with other operations on the same memory locations. Previously, software Transactional Memory implementations have been proposed to support software Transactional Memory (TM) Hardware TM provides far superior performance and ease of use over software TM.

US Patent Application Publication No. 2012/0227045A1 "Method, Apparatus, and System for Speculative Execution Event Counter Checkpointing and Restoring", Filed Feb. 2, 2012, incorporated by reference herein teaches an apparatus, method, and system are described herein for providing programmable control of performance/event counters. An event counter is programmable to track different events, as well as to be checkpointed when speculative code regions are encountered. So when a speculative code region is aborted, the event counter is able to be restored to it pre-speculation value. Moreover, the difference between a cumulative event count of committed and uncommitted execution and the committed execution, represents an event count/contribution for uncommitted execution. From information on the uncommitted execution, hardware/software may be tuned to enhance future execution to avoid wasted execution cycles.

U.S. Pat. No. 8,171,262 "Method and apparatus for clearing hazards using jump instructions", Filed Nov. 21, 2005, incorporated by reference herein teaches a method and apparatus for overlaying hazard clearing with a jump instruction within a pipeline microprocessor is described. The apparatus includes hazard logic to detect when a jump instruction specifies that hazards are to be cleared as part of a jump operation. If hazards are to be cleared, the hazard logic disables branch prediction for the jump instruction, thereby causing the jump instruction to proceed down the pipeline until it is finally resolved, and flushing the pipeline behind the jump instruction. Disabling of branch prediction for the jump instruction effectively clears all execution and/or instruction hazards that preceded the jump instruction. Alternatively, hazard logic causes issue control logic to stall the jump instruction for n-cycles until all hazards are cleared. State tracking logic may be provided to determine whether any instructions are executing in the pipeline that create hazards. If so, hazard logic performs normally. If not, state tracking logic disables the effect of the hazard logic.

SUMMARY

The shortcomings of the prior art are overcome and additional advantages are provided through the provision of a computer system having a branch predictor for speculatively predicting outcome of execution of branch instructions. The computer system is configured to execute transactional memory transactions characterized by executing instructions of the transaction speculatively, and only committing stores to memory upon completion of the transaction. When the transaction encounters a conflict, where another processor appears to be accessing memory locations of the transaction, the transaction aborts and discards buffered stores.

In an embodiment, branch prediction is suppressed for branch instructions executing in a transaction of a transactional memory (TM) environment. Execution of a transaction is started in a transaction execution mode, and a determination is made as to whether the started transaction was previously aborted. A transactional branch instruction of the started transaction is fetched for execution. Branch prediction is used or suppressed in executing the transactional branch instruction based on whether the transaction was previously aborted, wherein branch prediction is only used based on the transaction not having been previously aborted and is suppressed based on the transaction having been previously aborted any number of times.

In an embodiment, a transaction begin instruction is executed to start execution of the transaction, an address of a transaction begin instruction is saved based on the transaction being aborted, wherein the determining further comprises comparing a transaction begin instruction address of the started transaction with the saved address of a transaction begin instruction, wherein the started transaction is determined to be previously aborted based on the compare being equal.

In an embodiment, a re-execution mode instruction is executed, the executing setting a state indicating that the started transaction is a previously aborted transaction, and the state is used to determine the started transaction was a previously aborted transaction.

In an embodiment, the determining causes a state to be set, transactional branch instructions are executed in the transactional execution mode using branch prediction, based on the set state being in a first state; and the transactional branch instructions are executed in the transactional execution mode with branch prediction being suppressed, based on the set state being in a second state.

In an embodiment, the suppressing comprises stalling execution of the transactional branch instructions until required information about the transactional branch instruction is obtained.

In an embodiment, the required information comprises a final target address.

In an embodiment, the required information comprises final source operand data of source operands of the transactional branch instruction.

In an embodiment, the required information comprises final branch condition evaluation.

System, method and computer program products corresponding to the above-summary are described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Figure 1:
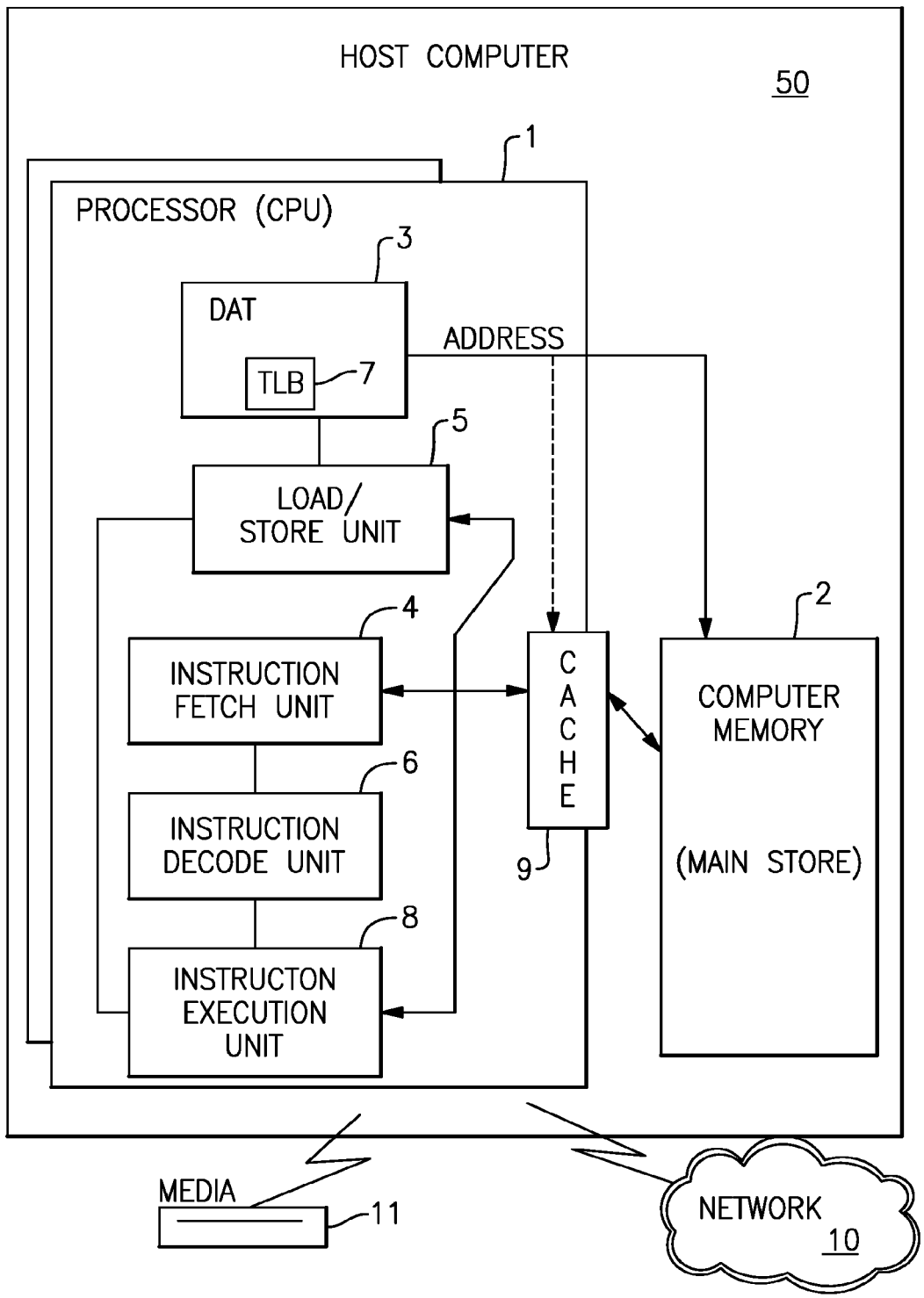
FIG. 1 depicts example components of a Host computer system.

Referring to FIG. 1, representative components of a prior art Host Computer system 50 are portrayed. Other arrangements of components may also be employed in a computer system, which are well known in the art. The representative Host Computer 50 comprises one or more CPUs 1 in communication with main store (Computer Memory 2) as well as I/O interfaces to storage devices 11 and networks 10 for communicating with other computers or SANs and the like. The CPU 1 is compliant with an architecture having an architected instruction set and architected functionality. The CPU 1 may have Dynamic Address Translation (DAT) 3 for transforming program addresses (virtual addresses) into real address of memory. A DAT typically includes a Translation Lookaside Buffer (TLB) 7 for caching translations so that later accesses to the block of computer memory 2 do not require the delay of address translation. Typically a cache 9 is employed between Computer Memory 2 and the Processor 1. The cache 9 may be hierarchical having a large cache available to more than one CPU and smaller, faster (lower level) caches between the large cache and each CPU. In some implementations the lower level caches are split to provide separate low level caches for instruction fetching and data accesses. In an embodiment, an instruction is fetched from memory 2 by an instruction fetch unit 4 via a cache 9. The instruction is decoded in an instruction decode unit (6) and dispatched (with other instructions in some embodiments) to instruction execution units 8. Typically several execution units 8 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 2, a load store unit 5 typically handles the access under control of the instruction being executed. Instructions may be executed in hardware circuits or in internal microcode (firmware) or by a combination of both.

Figure 13:
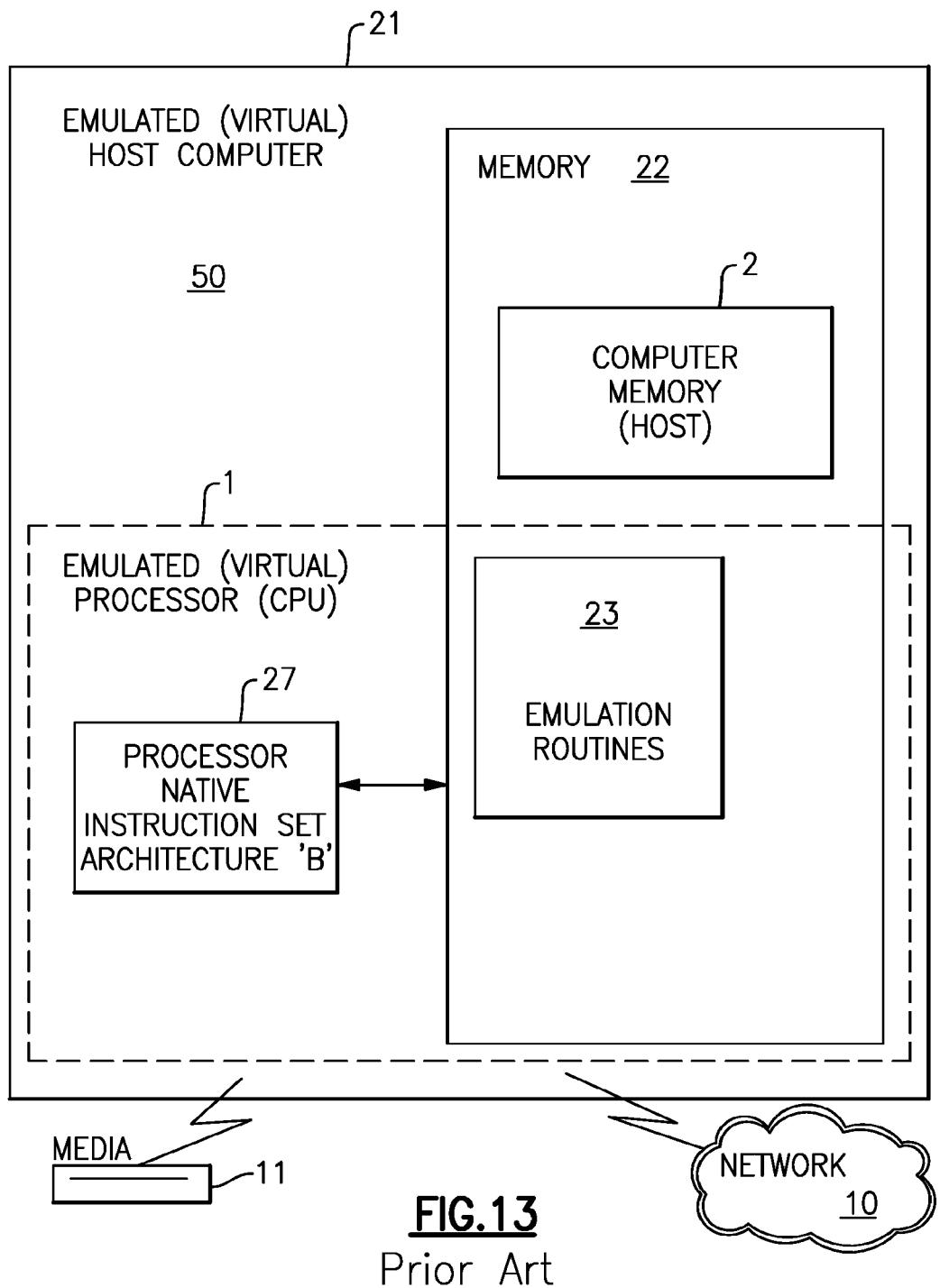
FIG. 13 depicts an emulated Host computer system.

In FIG. 13, an example of a prior art emulated Host Computer system 21 is provided that emulates a Host computer system 50 of a Host architecture. In the emulated Host Computer system 21, the Host processor (CPU) 1 is an emulated Host processor (or virtual Host processor) and comprises an emulation processor 27 having a different native instruction set architecture than that of the processor 1 of the Host Computer 50. The emulated Host Computer system 21 has memory 22 accessible to the emulation processor 27. In the example embodiment, the Memory 27 is partitioned into a Host Computer Memory 2 portion and an Emulation Routines 23 portion. The Host Computer Memory 2 is available to programs of the emulated Host Computer 21 according to Host Computer Architecture. The emulation Processor 27 executes native instructions of an architected instruction set of an architecture other than that of the emulated processor 1, the native instructions obtained from Emulation Routines memory 23, and may access a Host instruction for execution from a program in Host Computer Memory 2 by employing one or more instruction(s) obtained in a Sequence & Access/Decode routine which may decode the Host instruction(s) accessed to determine a native instruction execution routine for emulating the function of the Host instruction accessed. Other facilities that are defined for the Host Computer System 50 architecture may be emulated by Architected Facilities Routines, including such facilities as General Purpose Registers, Control Registers, Dynamic Address Translation and I/O Subsystem support and processor cache for example. The Emulation Routines may also take advantage of function available in the emulation Processor 27 (such as general registers and dynamic translation of virtual addresses) to improve performance of the Emulation Routines. Special Hardware and Off-Load Engines may also be provided to assist the processor 27 in emulating the function of the Host Computer 50.

In a mainframe, architected machine instructions are used by programmers, usually today "C" programmers often by way of a compiler application. These instructions stored in the storage medium may be executed natively in a z/Architecture® IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a Z/Architecture®, Linux can be used as well as machines which use emulation by Hercules, UMX, FSI (Fundamental Software, Inc) or Platform Solutions, Inc. (PSI), where generally execution is in an emulation mode. In emulation mode, emulation software is executed by a native processor to emulate the architecture of an emulated processor.

The native processor 27 typically executes emulation software 23 comprising either firmware or a native operating system to perform emulation of the emulated processor. The emulation software 23 is responsible for fetching and executing instructions of the emulated processor architecture. The emulation software 23 maintains an emulated program counter to keep track of instruction boundaries. The emulation software 23 may fetch one or more emulated machine instructions at a time and convert the one or more emulated machine instructions to a corresponding group of native machine instructions for execution by the native processor 27. These converted instructions may be cached such that a faster conversion can be accomplished. Notwithstanding, the emulation software must maintain the architecture rules of the emulated processor architecture so as to assure operating systems and applications written for the emulated processor operate correctly. Furthermore the emulation software must provide resources identified by the emulated processor 1 architecture including, but not limited to control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

An embodiment may be practiced by software (sometimes referred to Licensed Internal Code, Firmware, Micro-code, Milli-code, Pico-code and the like, any of which would be consistent with the teaching herein). Referring to FIG. 1, software program code which of an embodiment is typically accessed by the processor also known as a CPU (Central Processing Unit) 1 of the system 50 from long-term storage media 7, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory 2 or storage of one computer system over a network 10 to other computer systems for use by users of such other systems.

Alternatively, the program code may be embodied in the memory 2, and accessed by the processor 1 using the processor bus. Such program code includes an operating system which controls the function and interaction of the various computer components and one or more application programs. Program code is normally paged from dense storage media 11 to high-speed memory 2 where it is available for processing by the processor 1. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 14:
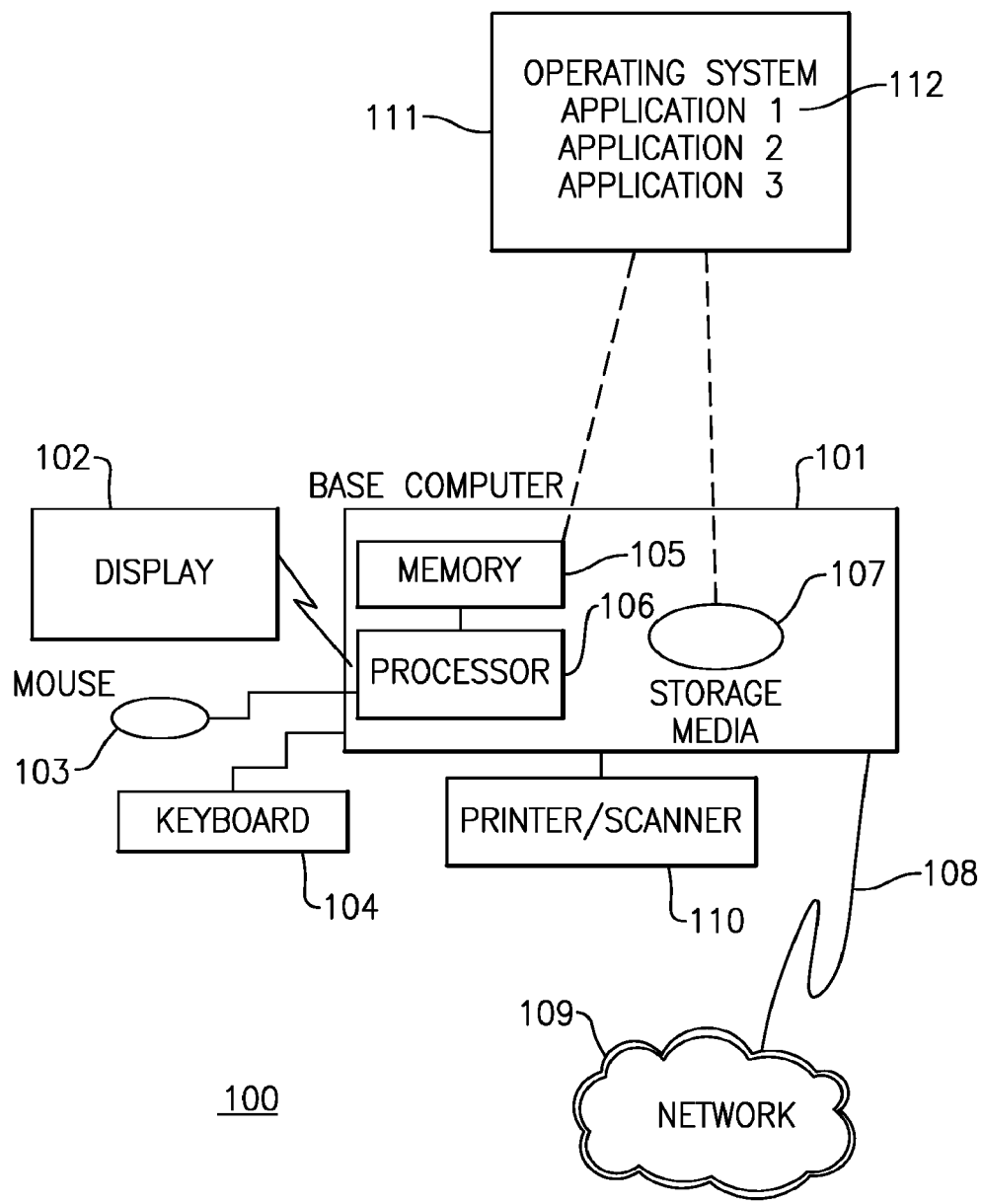
FIG. 14 depicts an example hardware server system.

FIG. 14 illustrates a representative workstation or server hardware system in which the embodiments may be practiced. The system 100 of FIG. 14 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive (including any of magnetic media, CD, DVD and Flash Memory for example) or a tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating 108 with a network 109. Example network adapters are communications channels, token ring. Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users 210 211 from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs 112. Program code is normally paged from dense storage media 107 to high-speed memory 105 where it is available for processing by the processor 106. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

According to "Intel® Architecture Instruction Set Extensions Programming Reference" 319433-012A, February 2012, incorporated by reference herein in its entirety, Chapter 8 teaches, in part, that multithreaded applications take advantage of increasing number of cores to achieve high performance. However, writing multi-threaded applications requires programmers to reason about data sharing among multiple threads Access to shared data typically requires synchronization mechanisms.

Intel® Transactional Synchronization Extensions (Intel® TSX) allow the processor to determine dynamically whether threads need to serialize through lock-protected critical sections, and to perform serialization only when required. This lets the processor to expose and exploit concurrency hidden in an application due to dynamically unnecessary synchronization.

With Intel TSX, programmer-specified code regions (also referred to as transactional regions) are executed transactionally. If the transactional execution completes successfully, then all memory operations performed within the transactional region will appear to have occurred instantaneously when viewed from other logical processors A processor makes architectural updates performed within the region visible to other logical processors only on a successful commit, a process referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, the optimistic execution fails. When this happens, the processor will roll back the execution, a process referred to as a transactional abort. On a transactional abort, the processor will discard all updates performed in the region, restore architectural state to appear as if the optimistic execution never occurred, and resume execution non-transactionally.

A processor can perform a transactional abort for numerous reasons. A primary cause is due to conflicting accesses between the transactionally executing logical processor and another logical processor. Such conflicting accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting access occurs if another logical processor either reads a location that is part of the transactional region's write-set or writes a location that is a part of either the read- or write-set of the transactional region. A conflicting access typically means serialization is indeed required for this code region. Since Intel TSX detects data conflicts at the granularity of a cache line, unrelated data locations placed in the same cache line will be detected as conflicts. Transactional aborts may also occur due to limited transactional resources. For example, the amount of data accessed in the region may exceed an implementation-specific capacity Additionally, some instructions and system events may cause transactional aborts. Frequent transactional aborts cause wasted cycles.

Hardware Lock Elision (HLE) provides a legacy compatible instruction set interface for programmers to do transactional execution. HLE provides two new instruction prefix hints: XACQUIRE and XRELEASE.

The programmer uses the XACQUIRE prefix in front of the instruction that is used to acquire the lock that is protecting the critical section. The processor treats the indication as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, all other processors will continue to see it as available afterwards. Since the transactionally executing logical processor neither added the address of the lock to its write-set nor performed externally visible write operations to it, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior makes an HLE execution functionally equivalent to an execution without the HLE prefixes.

The programmer uses the XRELEASE prefix in front of the instruction that is used to release the lock protecting the critical section. This involves a write to the lock. If the instruction is restoring the value of the lock to the value it had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, it will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; not following these guidelines will not cause a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of the transactional code region and the XEND instruction to specify the end of the transactional code region. The XBEGIN instruction takes an operand that provides a relative offset to the fallback instruction address if the RTM region could not be successfully executed transactionally.

A processor may abort RTM transactional execution for many reasons. The hardware automatically detects transactional abort conditions and restarts execution from the fallback instruction address with the architectural state corresponding to that at the start of the XBEGIN instruction and the EAX register updated to describe the abort status.

The XABORT instruction allows programmers to abort the execution of an RTM region explicitly. The XABORT instruction takes an 8 bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT) These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For FILE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary Software should not write to the elided lock inside a transactional HLE region with any instruction other than an XRELEASE prefixed instruction, otherwise it may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one monolithic transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_E-LIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's write set). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied the requirements described earlier. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements it. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. The behavior when HLE and RTM are nested together—HLE inside RTM or RTM inside HLE—is implementation specific. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

| RTM Abort Status Definition table | |
|---|---|
| EAX Register Bit Position | Meaning |
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, all memory updates from within the RTM region are discarded and never made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only a committed transactional execution updates architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort.

Operations on the instruction pointer register, general purpose registers (GPRs) and the status flags (CF, OF, SF, PF, AF, and ZF).

Operations on XMM and YMM registers and the MXCSR register

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT
CPUID
PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR. •Interrupts: INTn, INTO. •IO: IN, INS, REP INS, OUT, OUTS, REP OUTS and their variants. •VMX: VMPTRLD, VMPTRST, VMCLEAR, VMREAD, VMWRITE, VMCALL, VMLAUNCH, VMRESUME, VMXOFF, VMXON, INVEPT, and INVVPID. •SMX: GETSEC. •UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or microarchitectural implementation causes. Keep in mind that the following list is not a comprehensive discussion of all abort causes.

Any fault or trap in a transaction that must be exposed to software will be suppressed. Transactional execution will abort and execution will transition to a nontransactional execution, as if the fault or trap had never occurred. If any exception is not masked, that will result in a transactional abort and it will be as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a nontransactional execution. The asynchronous events will be pended and handled after the transactional abort is processed.

Transactions only support write-back cacheable memory type operations. A transaction may always abort if it includes operations on any other memory type. This includes instruction fetches to UC memory type.

Memory accesses within a transactional region may require the processor to set the Accessed and Dirty flags of the referenced page table entry. The behavior of how the processor handles this is implementation specific some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations Regardless, the architecture ensures that, if the transactional region aborts, then the transactionally written state will not be made architecturally visible through the behavior of structures such as TLBs.

Executing self-modifying code transactionally may also cause transactional aborts programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line. A in a transactional region and another logical processor P1 writes A (either inside or outside a transactional region) then logical processor P0 may abort if logical processor P1's write interferes with processor P0's ability to execute transactionally. Similarly, if P0 writes line A in a transactional region and P1 reads or writes A (either inside or outside a transactional region), then P0 may abort if P1's access to A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution Embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald. June 2009, incorporated by reference herein, fundamentally, there are three mechanisms needed to implement an atomic and isolated transactional region: versioning, conflict detection, and contention management.

To make a transactional code region appear atomic, all its modifications must be stored and kept isolated from other transactions until commit time. The system does this by implementing a versioning policy Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure serializability between transactions, conflicts must be detected and resolved. The system detects conflicts by implementing a conflict detection policy, either optimistic or pessimistic. An optimistic system executes transactions in parallel, checking for conflicts only when a transaction commits. Pessimistic systems check for conflicts at each load and store. Similar to versioning, conflict detection also uses the cache, marking each line as either part of the read-set, part of the write-set, or both. The system resolves conflicts by implementing a contention management policy many policies exist, some more appropriate for optimistic conflict detection and some more appropriate for pessimistic. In this chapter, we describe some popular policies and how they work.

Since each transactional memory (TM) system needs both versioning and conflict detection, these options give rise to four distinct TM designs: Eager-Pessimistic (EP), Eager-Optimistic (EO), Lazy-Pessimistic (LP), and Lazy-Optimistic (LO).

IBM zEC12 Enterprise Server Embodiment:

The IBM zEC12 enterprise server introduced transactional execution (TX) in transactional memory. The embodiment is described in part in a paper "Transactional Memory Architecture and Implementation for IBM System z" of Proceedings Pages 25-36 presented at MICRO-45, 1-5 Dec. 2012/Vancouver, British Columbia, Canada and available from IEEE Computer Society Conference Publishing Services (CPS). "Transactional Memory Architecture and Implementation for IBM System z" is incorporated by reference herein.

Transactions started with TBEGIN are not assured to ever successfully complete with TEND, since they can experience an aborting condition at every attempted execution, e.g. due to repeating conflicts with other CPUs. This requires that the program supports a fallback path to perform the same operation non-transactionally, e.g. by using traditional locking schemes. This puts significant burden on the programming and software verification teams, especially where the fallback path is not automatically generated by a reliable compiler.

The requirement of providing a fallback path for aborted Transaction Execution (TX) transactions are onerous. Many transactions operating on shared data structures are expected to be short, touch only few distinct memory locations, and use simple instructions only. For those transactions, the IBM zEnterprise EC12 introduces the concept of constrained transactions; under normal conditions, the CPU assures that constrained transactions eventually end successfully, albeit without giving a strict limit on the number of necessary retries. A constrained transaction starts with a TBEGINC instruction and ends with a regular TEND. Implementing a task as constrained or non-constrained transaction typically results in very comparable performance, but constrained transactions simplify software development by removing the need for a fallback path. IBM's Transactional Execution architecture is described in z/Architecture®, Principles of Operation, 9th edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (hence no loops or subroutine calls), the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the FPR control and the program interruption filtering fields do not exist and the controls are considered to be zero. On a transaction abort, the instruction address is set back directly to the TBEGINC instead to the instruction after, reflecting the immediate retry and absence of an abort path for constrained transactions.

Nested transactions are not allowed within constrained transactions, but if a TBEGINC occurs within a nonconstrained transaction it is treated as opening a new nonconstrained nesting level just like TBEGIN would. This can occur e.g. if a non-constrained transaction calls a subroutine that uses a constrained transaction internally. Since interruption filtering is implicitly off, all exceptions during a constrained transaction lead to an interruption into the operating system (OS). Eventual successful finishing of the transaction of course relies on the capability of the OS to page-in the at most 4 4 Kbyte pages touched by any constrained transaction. The OS must also ensure time-slices long enough to allow the transaction to complete.

TABLE 2

Example Transaction Code

|  | LHI | R0,0 | *initialize retry count=0 |
|---|---|---|---|
| loop | TBEGIN |  | *begin transaction |
|  | JNZ | abort | *go to abort code if CC1=0 |
|  | LT | R1, lock | *load&test the fallback lock |
|  | JNZ | lckbzy | *branch if lock busy |
|  | . . . perform operation . . . |  |  |
|  | TEND |  | *end transaction |
|  | . . . |  |  |
| lckbzy | TABORT |  | *abort if lock busy; this |
|  |  |  | *resumes after TBEGIN |
| abort | JO | fallback | *no retry if CC=3 |
|  | AHI | R0, 1 | *increment retry count |
|  | CIJNL | R0,6, fallback | *give up after 6 attempts |
|  | PPA | R0, TX | *random delay based on |
|  |  |  | *retry count |
|  | . . . potentially wait for lock to become free |  |  |
|  | J | loop | *jump back to retry |
| fallback |  |  |  |
|  | OBTAIN | lock | *using Compare&Swap |
|  | . . . perform operation . . . |  |  |
|  | RELEASE lock |  |  |
|  | . . . . |  |  |

TABLE 3

Transaction Code Example

| TBEGINC |  | *begin constrained transaction |
|---|---|---|
| ...perform operation... |  |  |
| TEND |  | *end transaction |
| ... |  |  |

Table 3 shows the constrained-transactional implementation of the code in Table 2 example, assuming that the constrained transactions do not interact with other locking-based code. No lock testing is shown therefore, but could, of course, be added if constrained transactions and lock-based code were mixed.

When failure occurs repeatedly, software emulation is performed using millicode as part of system firmware. Advantageously, constrained transactions have desirable properties because of the burden removed from programmers.

IBM zEnterprise EC12 processor, introduced the transactional execution facility. The processor can decode 3 instructions per clock cycle; simple instructions are dispatched as single micro-ops, and more complex instructions are cracked into multiple micro-ops. The micro-ops (Uops) are written into a unified issue queue, from where they can be issued out-of-order. Up to two fixed-point, one floating-point, two load/store, and two branch instructions can execute every cycle. A Global Completion Table (GCT) holds every micro-op. The GCT is written in-order at decode time, tracks the execution status of each micro-op, and completes instructions when all micro-ops of the oldest instruction group have successfully executed.

The level 1 (L1) data cache is a 96 KB (kilo-byte) 6-way associative cache with 256 byte cache-lines and 4 cycle use latency, coupled to a private 1 MB (mega-byte) 8-way associative L2 2nd-level data cache with 7 cycles use-latency penalty for L1 misses. L1 cache is the cache closest to a processor and Ln cache is a cache at the nth level of caching. Both L1 and L2 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 and L2 are store-through and thus do not contain dirty lines. The L3 and L4 caches are store-in and track dirty states. Each cache is inclusive of all its connected lower level caches.

Coherency requests are called "cross interrogates" (XI) and are sent hierarchically from higher level to lower-level caches, and between the L4s. When one core misses the L1 and L2 and requests the cache line from its local L3, the L3 checks whether it owns the line, and if necessary sends an XI to the currently owning L2/L1 under that L3 to ensure coherency, before it returns the cache line to the requestor. If the request also misses the L3, the L3 sends a request to the L4 which enforces coherency by sending XIs to all necessary L3s under that L4, and to the neighboring L4s. Then the L4 responds to the requesting L3 which forwards the response to the L2/L1.

Note that due to the inclusivity rule of the cache hierarchy, sometimes cache lines are XI'ed from lower-level caches due to evictions on higher-level caches caused by associativity overflows from requests to other cache lines. We call those XIs "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote- and Exclusive-XIs need a response back to the XI sender. The target cache can "accept" the XI, or send a "reject" response if it first needs to evict dirty data before accepting the XI. The L1/L2 caches are store through, but may reject demote- and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are very similar to those described for the IBM z10 by P. Mak, C. Walters, G. Strait, in "IBM System z10 processor cache subsystem microarchitecture", IBM Journal of Research and Development, Vol 53:1, 2009 incorporated by reference herein.

Figure 2:
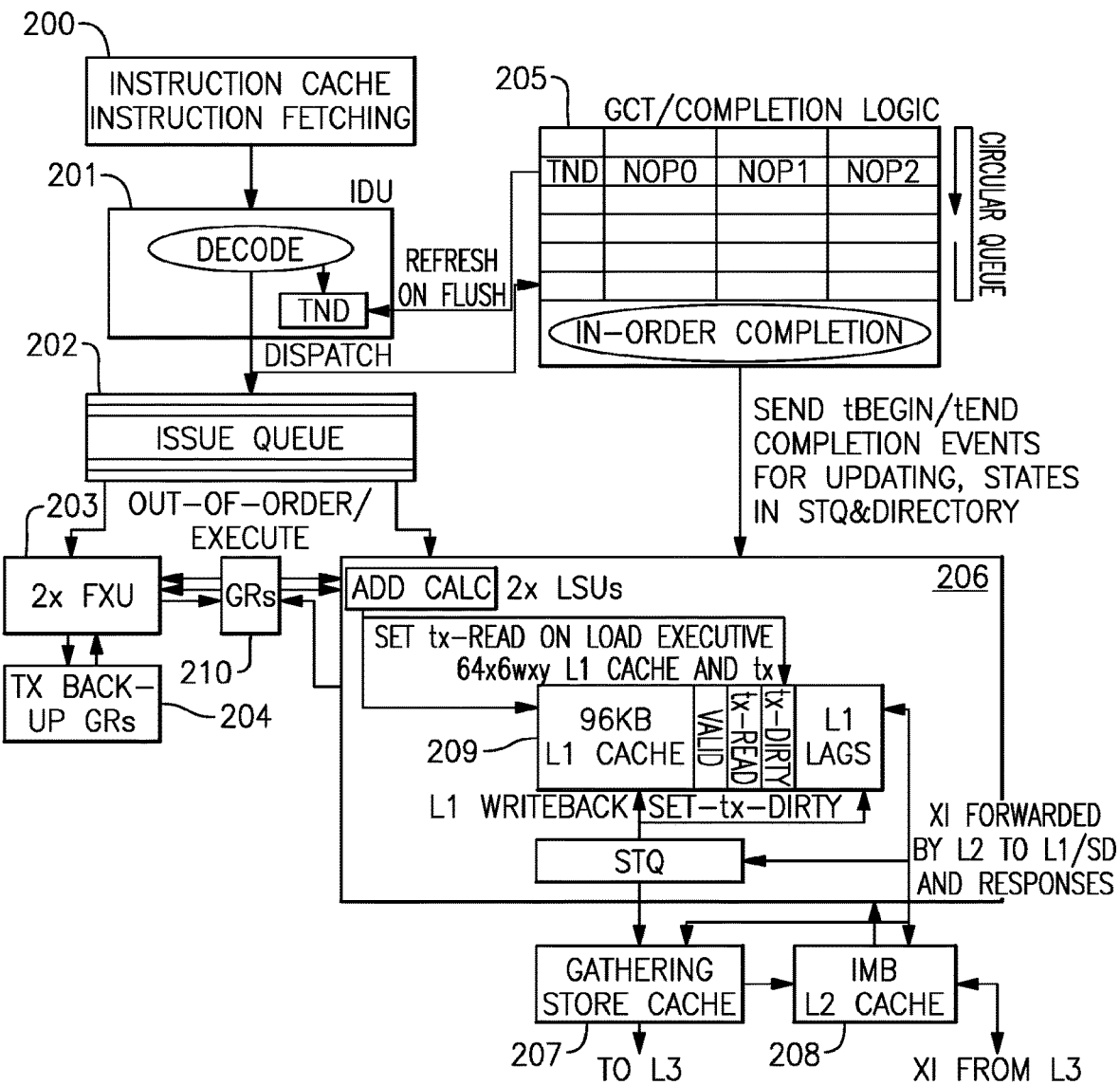
FIG. 2 shows components of an example computer system.

FIG. 2 depicts example components of an example central processing unit (CPU) embodiment. An instruction fetching unit 200 comprising an instruction cache, fetches instructions from memory (or higher level shared cache for example). Data is held in a data cache (L1 cache) 209. Fetched instructions are sent to the instruction decode unit (IDU) 201, where they are decoded and dispatched to an issue queue 202. Instructions may then be issued out-of-order to various execution units 203 206 for out-of-order execution. Execution units include Fixed Point Units (FXUs) (two for example), and a Load/Store Unit (LSU) (two LSUs shown here). The execution units have access to general registers (GRs) 210 which may be implemented using well know register renaming techniques. The LSU 206 handles loading and storing of data from memory and keeps track of program order of load/store. The LSU includes, for example, an address calculator for calculating the address of memory of data, an L1 data cache 209 including data and a directory (L1 tags) for locating the data, and a store queue (STQ). The may have access to a shared cache 208 that may then have access to a higher level L3 cache or main storage. A gathering store cache 207 may also be employed for accumulating data to be stored in L3 or memory. Cross interrogate (XI) communications provide for cache coherency. A completion logic queue 205, in communication with the decode unit 201, provides for in-order completion of the out-of-order executed instructions.

Transactional Instruction Execution

The instruction decode unit (IDU) keeps track of the current transaction nesting depth (TND), see FIG. 2. When the IDU receives a TBEGIN instruction, the nesting depth is incremented, and conversely decremented on TEND instructions. The nesting depth is written into the GCT for every dispatched instruction. When a TBEGIN or TEND is decoded on a speculative path that later gets flushed, the IDU's nesting depth is refreshed from the youngest GCT entry that is not flushed. The transactional state is also written into the issue queue for consumption by the execution units, mostly by the Load/Store Unit (LSU). The TBEGIN instruction may specify a TDB (transaction diagnostic block) for recording status information, should the transaction abort before reaching a TEND instruction.

Similar to the nesting depth, the IDU/GCT collaboratively track the AR/FPR-modification masks through the transaction nest; the IDU can place an abort request into the GCT when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple microops depending on the GR-Save-Mask; each micro-op will be executed by one of the two FXUs to save a pair of GRs into a special transaction-backup register file, that is used to later restore the GR content is case of a transaction abort. Also the TBEGIN spawns micro-ops to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op instructions; NTSTG is handled like a normal store except that it is marked as non-transactional in the issue queue so that the LSU can treat it appropriately. TEND is a no-op at execution time, the ending of the transaction is performed when TEND completes.

As mentioned, instructions that are within a transaction are marked as such in the issue queue, but otherwise execute mostly unchanged the LSU performs isolation tracking as described in the next section.

Since decoding is in-order, and since the IDU keeps track of the current transactional state and writes it into the issue queue along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Of course program order is restored through the GCT at completion time. The length of transactions is not limited by the size of the GCT, since general purpose registers (GRs) can be restored from the backup register file.

During execution, the program even recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit tracks cache lines that were accessed during transactional execution, and triggers an abort if an XI from another CPU (or an LRU-XI) conflicts with the footprint. If the conflicting XI is an exclusive or demote XI, the LSU rejects the XI back to the L3 in the hope of finishing the transaction before the L3 repeats the XI. This "stiffarming" is very efficient in highly contended transactions In order to prevent hangs when two CPUs stiff-arm each other, a XI-reject counter is implemented, which triggers a transaction abort when a threshold is met.

The L1 cache directory is traditionally implemented with static random access memories (SRAMs). For the transactional memory implementation, the valid bits (64 rows×6 ways) of the directory have been moved into normal logic latches, and are supplemented with two more bits per cache line: the TX-read and TX-dirty bits.

The TX-read bits are reset when a new outermost TBEGIN is decoded (which is interlocked against a prior still pending transaction). The TX-read bit is set at execution time by every load instruction that is marked "transactional" in the issue queue. Note that this can lead to over-marking if speculative loads are executed, for example on a mispredicted branch path. The alternative of setting the TX-read bit at load completion time was too expensive for silicon area, since multiple loads can complete at the same time, requiring many read-ports on the load-queue.

Stores execute the same way as in non-transactional mode, but a transaction mark is placed in the store queue (STQ) entry of the store instruction. At write-back time, when the data from the STQ is written into the L1, the TX-dirty bit in the L1-directory is set for the written cache line store write-back into the L1 occurs only after the store instruction has completed, and at most one store is written back per cycle. Before completion and write-back, loads can access the data from the STQ by means of store-forwarding; after write-back, the CPU can access the speculatively updated data in the L1. If the transaction ends successfully, the TX-dirty bits of all cache-lines are cleared, and also the TX-marks of not yet written stores are cleared in the STQ, effectively turning the pending stores into normal stores.

On a transaction abort, all pending transactional stores are squashed from the STQ, even those already completed. All cache lines that were modified by the transaction in the L1, that is, have the TX-dirty bit on, have their valid bits turned off, effectively removing them from the L1 cache instantaneously.

The architecture requires that before completing a new instruction we ensure that isolation of the transaction readand write-set is maintained. This is ensured by stalling instruction completion at appropriate times when XIs are pending; we allow speculative out-of order execution, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 receives an XI, it accesses the directory to check validity of the XI'ed address in the L1, and if the TX-read bit is active on the XI'ed line and the XI is not rejected, the LSU triggers an abort. When a cache line with active TX-read bit is LRU'ed from the L1, a special LRU-extension vector remembers for each of the 64 rows of the L1 that a TX-read line existed on that row. Since no precise address tracking exists for the LRU extensions, any non-rejected XI that hits a valid extension row the LSU triggers an abort. Providing the LRU-extension effectively increases the read footprint capability from the L1-size to the L2-size and associativity, provided no conflicts with other CPUs against the non-precise LRU-extension tracking causes aborts.

The store footprint is limited by the store cache size and thus implicitly by the L2 size and associativity. No LRU-extension action needs to be performed when a TX-dirty cache line is LRU'ed from the L1.

Store Cache

In prior systems, since the L1 and L2 are store-through caches, every store instruction causes an L3 store access; with now 6 cores per L3 and further improved performance of each core, the store rate for the L3 (and to a lesser extent for the L2) becomes problematic for certain workloads. In order to avoid store queuing delays a gathering store cache had to be added, that combines stores to neighboring addresses before sending them to the L3.

For transactional memory performance, it is acceptable to kill every TX-dirty cache line from the L1 on transaction aborts, because the L2 cache is very close (7 cycles L1 miss penalty) to bring back the clean lines. It would however be unacceptable for performance (and silicon area for tracking) to have transactional stores write the L2 before the transaction ends and then invalidate (aka "kill") all dirty L2 cache lines on abort (or even worse on the shared L3).

The two problems of store bandwidth and transactional memory store handling can both be addressed with the gathering store cache. The cache is a circular queue of 64 entries, each entry holding 128 bytes of data with byte-precise valid bits. In non-transactional operation, when a store is received from the LSU, the store cache checks whether an entry exists for the same address, and if so gathers the new store into the existing entry. If no entry exists, a new entry is written into the queue, and if the number of free entries falls under a threshold, the oldest entries are written back to the L2 and L3 caches.

When a new outermost transaction begins, all existing entries in the store cache are marked closed so that no new stores can be gathered into them, and eviction of those entries to L2 and L3 is started. From that point on, the transactional stores coming out of the LSU STQ allocate new entries, or gather into existing transactional entries. The write-back of those stores into L2 and L3 is blocked, until the transaction ends successfully; at that point subsequent (post-transaction) stores can continue to gather into existing entries, until the next transaction closes those entries again.

The store cache is queried on every exclusive or demote XI, and causes an XI reject if the XI compares to any active entry. If the core is not completing further instructions while continuously rejecting XIs, the transaction is aborted at a certain threshold to avoid hangs.

The LSU requests a transaction abort when the store cache overflows. The LSU detects this condition when it tries to send a new store that cannot merge into an existing entry, and the entire store cache is filled with stores from the current transaction. The store cache is managed as a subset of the L2: while transactionally dirty lines can be evicted from the L1, they have to stay resident in the L2 throughout the transaction. The maximum store footprint is thus limited to the store cache size of 64×128 bytes, and it is also limited by the associativity of the L2. Since the L2 is 8-way associative and has 512 rows, it is typically large enough to not cause transaction aborts.

If a transaction aborts, the store cache is notified and all entries holding transactional data are invalidated. The store cache also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs to restore.

The CPU supports a special millicode-only instruction to read out the backup-GRs and copy them into the main GRs. The TBEGIN instruction address is also loaded from an SPR to set the new instruction address in the PSW to continue execution after the TBEGIN once the millicode abort sub-routine finishes That PSW may later be saved as program-old PSW in case the abort is caused by a non-filtered program interruption.

The TABORT instruction may be millicode implemented; when the IDU decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs to stop all conflicting work, retry the local transaction, before releasing the other CPUs to continue normal processing. Multiple CPUs must be coordinated to not cause deadlocks, so some serialization between millicode instances on different CPUs is required.

Branch Prediction:

Branch instructions are instructions that are used to deviate from a sequence of instructions. A Branch instruction may be conditional, in which case execution of the branch instruction, tests instruction dependent conditions to determine if the next sequential instruction (NSI) following the branch is to be executed (branch not-taken), or if the program counter (PC) should be updated to point to a next instruction to be executed (branch taken), in which case the address of the next instruction to be executed is provided by the branch instruction. A jump instruction is a special form of a branch instruction, in that a jump instruction is always taken.

Modern processors use many techniques to speed up instruction execution. Instructions may now be executed speculatively or out-of-program-order to improve performance, where such instructions may be completed in-order. In some cases, an instruction executed out-of-order may need to be re-executed because of unresolved dependencies. In some cases, many instructions executed speculatively, are discarded in a pipeline due to resolution of an intervening branch instruction. The term branch instruction and jump instruction may be used interchangeably herein.

Processor systems use branch prediction methods to predict, for a future branch instruction, if a conditional branch will be taken, and/or to predict the address of the target instruction of the branch, and/or to predict the target instruction of the branch. A branch predictor tries to guess which way a branch will go before this is known for sure. For example the actual branch is conditional and the conditions are not resolved yet. For another example, the target address of the branch instruction is in a general register, but other earlier instructions may target the register. For another example, calculation of the target address is complex, so a predictor may provide an early target address. The purpose of the branch predictor is to improve the flow in the instruction pipeline. Both the prediction and the target address are speculative, and might be incorrect. The branch predictor attempts to avoid waiting for condition evaluation by guessing whether the conditional branch is likely to be taken or not taken. If a branch is guessed to be taken, the instructions starting at the branch target address are fetched and speculatively executed. If a branch is guessed "not taken", the execution will continue with the first instruction of code which follows immediately after the branch instruction.

Figure 3:
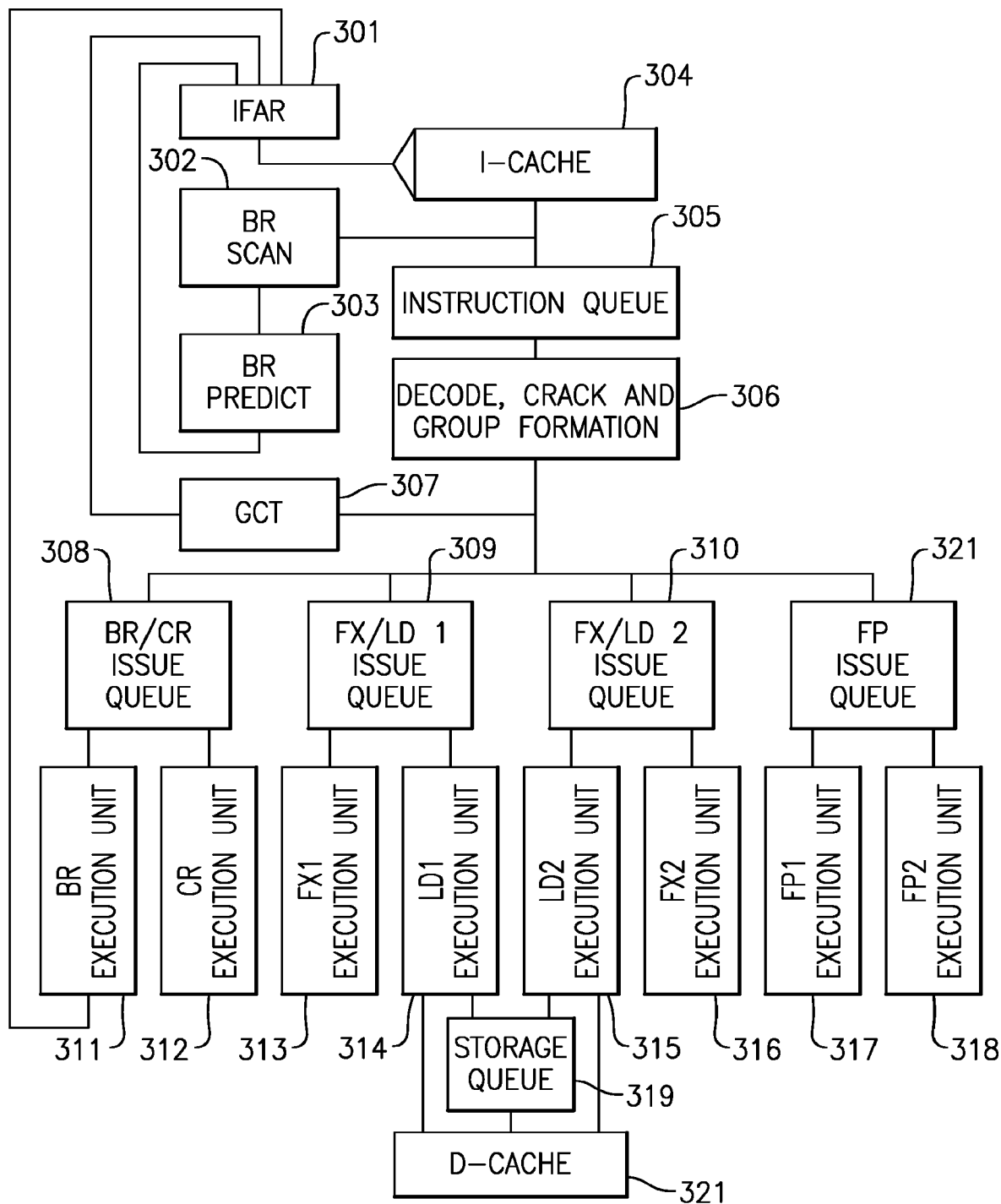
FIG. 3 illustrates an exemplary pipeline.

Referring to FIG. 3, in a processor pipeline, conditional branch instructions are evaluated in the execution stage 311. Without branch prediction 303, the processor would have to wait until the branch has passed the execute stage to know its outcome, and to allow the next instruction to enter the fetch stage 301 in the pipeline. The branch predictor 303 guesses whether the conditional branch is most likely to be taken or not taken. The branch that is guessed to be the most likely is then fetched and speculatively executed.

If it is later detected that the branch guess was wrong, then the speculatively executed or partially executed instructions in the pipeline following the branch instruction are discarded and the pipeline starts over with the correct branch, thus, incurring a delay that could have been avoided if the branch guess was correct. The time that is wasted in case of a branch misprediction may be equal to the number of stages in the pipeline from the fetch stage 301 to the execute stage, and may be between 10 and 20 clock cycles for modern high performance microprocessors.

Branch taken prediction is not the same as branch target prediction. Branch taken prediction attempts to guess whether a conditional branch will be taken or not. Branch target prediction attempts to guess the target of a taken conditional or unconditional branch before it is computed by decoding and executing the branch instruction itself. Branch taken prediction and branch target prediction are often combined into the same branch prediction circuitry.

If a processor is executing a TX transaction in a transactional execution TX module, and a branch prediction takes a wrong path, the wrongly guessed path might include some TX memory load and store instructions whose addresses would be added to the transaction read and write sets, respectively. If there is a TX conflict with any of these addresses, the transaction will be aborted, even though these addresses were wrongly added to the read set because of the speculative execution resulting from a wrong branch guess.

In a non-transactional execution, once the branch condition is evaluated, the branch prediction is updated. Each update of the branch predictor (branch taken or not) influences the future prediction of the branch predictor. In a transactional execution, a transaction might be aborted after a branch was evaluated, and the branch predictor was updated. A transaction can abort several times, and each time the branch predictor facilities can be updated. This would cause branch prediction to incorrectly track the number of events when a branch was taken, thus giving a faulty branch prediction for the future in the case of saturating branch predictors, where multi-execution of the same branch due to retries will make the branches appear to be stuck at the strong value (for either taken or not taken, based on observed execution behavior) due to repeated update.

The IBM Journal of Research and Development, Vol 46, "Power4 system microarchitecture" pages 5-25 published January 200, and incorporated by reference herein, teaches an example processor having an exemplary branch prediction embodiment.

Referring again to FIG. 3 which shows a high-level block diagram of an exemplary high performance pipeline based on the pipeline if IBM's POWER4 processor. The internal microarchitecture of the core processor may be a speculative superscalar out-of-order execution design. Up to eight instructions can be issued each cycle, with a sustained completion rate of five instructions. In order to exploit instruction-level parallelism, there are eight execution units 311-318, each capable of being issued an instruction each cycle. Two identical floating-point execution units 317 318, each capable of starting a fused multiply and add each cycle are provided. In order to feed the dual floating-point units 317 318, two load/store units 314 315, each capable of performing address-generation arithmetic, are provided. Additionally, there are dual fixed-point execution units 313 316, a branch execution unit 311, and an execution unit to perform logical operations on the condition register 312. The instruction fetch address register (IFAR) 301 may be used to access instructions in an instruction cache (I-Cache) 304. Branch scan (BR scan) logic 302 determines if branch type instructions are entering the pipeline, and if so a branch predictor (BR predictor) 303 may provide a speculative target address of the target of the Branch instruction, to the IFAR 301 to speculatively execute the branch taken path.

The Instructions are queued in an instruction queue 305 for execution. A decode unit 306 may decode and crack instructions into micro-ops (Uops) and grouped into instructions that can be executed out of order. Issue queues 308 309 310 320 to be issued to respective execution units. A branch/ condition register (BR/CR) issue queue 308 queues instructions for execution in the BR execution unit (EU) 311, a pair of Fixed point/load (store) (FX/LD1, FX/LD2) issue queues 309 310 hold fixed point and load (store) instructions for respective FX1 313 and LD1 314 EUs and FX2 315 and LD2 316 EUs, and a floating point (FP) issue queue 320 holds instructions for respective FP1 317 and FP2 318 EUs. Store operations are queued in a storage queue 319 to be staged to a data cache (D-cache) 321.

The shown pipeline of FIG. 3 is given as example only in order to teach aspects of an embodiment, and anybody of average skill in the art will appreciate that aspects of the embodiment can be practiced in other processor pipelines, more complex, or simpler, with a different arrangement of pipeline units, execution units and pipeline depth.

As shown above, branch prediction can be implemented to help mitigate the effects of the long pipeline necessitated by a high-frequency design, processors use branch-prediction mechanisms. The exact implementation of the branch predictor does not change the scope of this invention, and different branch prediction implementations can be used, as anybody skilled in the art will understand. The example processor embodiment, based on POWER4, uses a multi-level branch-prediction scheme to predict whether or not a conditional branch instruction is taken. Additionally, branch target addresses can be predicted for several types of branch instructions.

In POWER4, up to eight instructions are fetched each cycle from the instruction cache. The branch-prediction logic scans the fetched instructions, looking for up to two branches each cycle. Depending upon the branch type found, various branch-prediction mechanisms engage to help predict the branch direction or the target address of the branch or both. For conditional branches, branch directions are predicted. Branch target addresses are predicted for the PowerPC branch-to-link-register (bclr) and branch-to-count-register (bcctr) instructions. Target addresses for absolute and relative branches are computed directly as part of the branch scan function, and are not predicted.

As branch instructions flow through the rest of the pipeline and ultimately execute in the branch-execution unit, the actual outcomes of the branches are determined. At that point, if the predictions were found to be correct, the branch instructions are completed like all other instructions. If a prediction is found to be incorrect, the instruction-fetch logic causes the mispredicted instructions to be discarded and begins refetching instructions along the corrected path.

A preferred processor embodiment uses a set of three branch-history tables to predict the direction of branch instructions. The first table, called the local predictor, may be a 16 384-entry array indexed by the branch instruction address producing a 1-bit predictor that indicates whether the branch direction should be taken or not taken. The second table, called the global predictor, predicts the branch direction on the basis of the actual path of execution to reach the branch. The path of execution may be identified by an 11-bit global history vector, one bit per group of instructions fetched from the instruction cache for each of the previous eleven fetch groups. Each bit in the global history vector indicates whether or not the next group of instructions fetched may be from a sequential cache sector. The vector may be used to produce the second 1-bit branch-direction predictor which indicates whether the branch should be predicted to be taken or not taken. A third table, called the selector table, keeps track of which of the two prediction schemes works better for a given branch and may be used to select between the local and the global predictions. As branch instructions are executed and resolved, the branch-history tables and the other predictors are updated to reflect the latest and most accurate information.

A preferred processor implementation uses a link stack to predict the target address for a branch-to-link instruction that corresponds to a subroutine return. By setting the hint bits in a branch-to-link instruction, software communicates to the processor that a branch-to-link instruction represents a subroutine return, a target address that is likely to repeat, or neither. When instruction-fetch logic fetches a branch-to-link instruction with taken prediction and with hint bits indicating a subroutine return, the link stack may be popped, and instruction fetching starts from the popped address.

The target address of a branch-to-count instruction may be often repetitive. This may be also true for some of the branch-to-link instructions that are not predictable through the use of the link stack (because they do not correspond to a subroutine return). By setting the hint bits appropriately, software communicates to the hardware whether the target addresses for such branches are repetitive. In these cases, processor uses a direct-mapped cache, called a count cache, to predict the repetitive targets Each entry in the count cache can hold a 62-bit address. When a branch-to-link or branch-to-count instruction is executed, for which the software indicates that the target is repetitive and predictable, the target address is written in the count cache. When such an instruction is fetched, the target address is predicted using the count cache.

Figure 4:
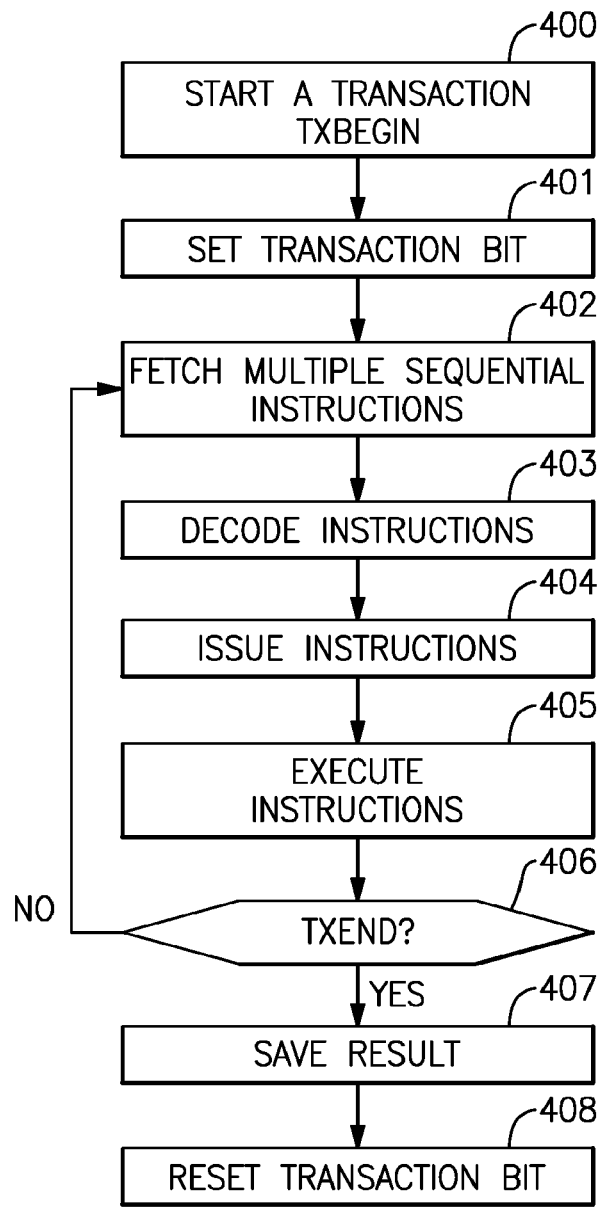
FIG. 4 illustrates an exemplary flow for identifying a transaction.

FIG. 4 describes an example control flow showing how a processor might identify that it is in a transactional execution (TX). When the instruction TXBEGIN is issued 400, a status bit indication transactional execution is set 401 in one embodiment, instruction TXBEGIN is used to indicate start of a transactional execution. In another embodiment, the instruction indicating the beginning of a transaction may be XBEGIN. Other instructions indicating the beginning of transactional execution (TX) can be used without departing from the scope of invention.

The execution proceeds to instruction fetch 402 and decode 403 in the transaction mode. The execution proceeds in accordance with the transaction mode. Multiple sequential instructions are fetched 402, decoded 403, and issued 404 and executed 405, and the transactional execution proceeds until a TXEND is encountered 406 indicating the TX has successfully completed. In accordance with TX architecture, results of the TX are committed to memory 407 at TXEND and the transaction mode bit is reset 408. Transaction's read and write sets are recorded, and results are buffered until a transaction is committed.

The execution continues with fetching 402, decoding 403, issuing 404 and executing instructions 405 with the status bit indicating transaction mode set 401.

When the instruction TXEND is fetched and decoded, this is the indicator that the transaction reached its end, and if no conflicts are detected, the buffered results can be committed to memory 407. The execution proceeds to saving 407 the results of the transaction to the memory. Based on executing the TXEND, the status bit indicating transaction is cleared 408. (The TX status bit may be also cleared when an abort condition is encountered).

In an embodiment, branch prediction updates are made to a transaction prediction buffer while the updates to the predictor are suspended. The prediction buffer may be updated with the same information that the predictor may be updated with, or it may be updated only with a subset of that data, for example, only branch direction prediction might be updated.

In an embodiment, the predictor may be updated with information from the prediction buffer when a transaction successfully completes (TEND).

In an embodiment the predictor may be not updated with information from the prediction buffer when a transaction successfully completes (TEND).

In an embodiment the predictor may be not updated with information from the prediction buffer when a transaction aborts.

In an embodiment, the prediction buffer may be a first-in first-out buffer

Figure 5:
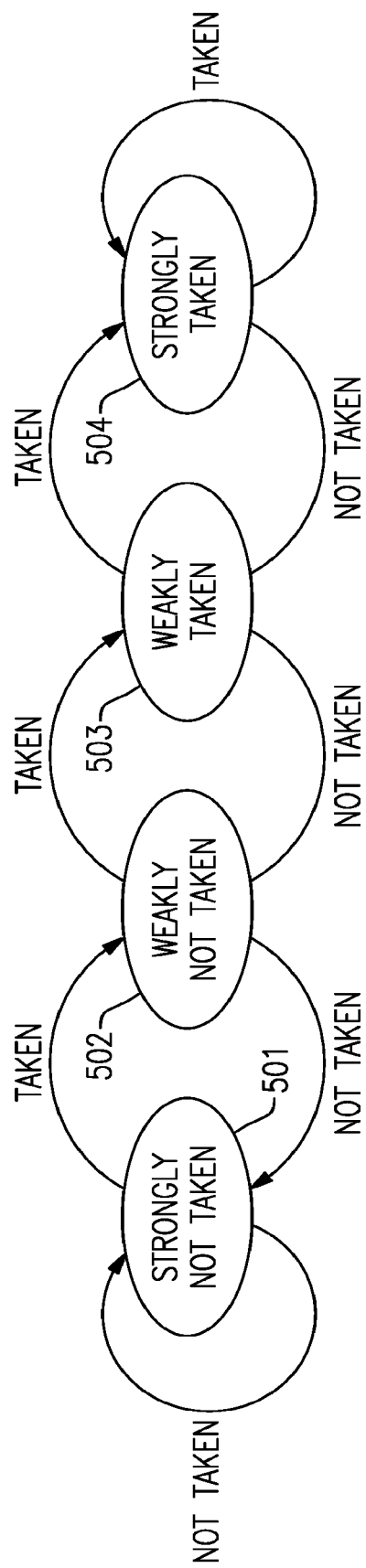
FIG. 5 depicts an exemplary branch prediction state machine.

FIG. 5 describes one possible method for branch prediction, called saturating counter, or bimodal predictor. This predictor may be a state machine with four states 501 502 503 504: Strongly not taken 501, Weakly not taken 502, Weakly taken 503, and Strongly taken 504. When a branch is evaluated, the corresponding state machine is updated. Branches evaluated as not taken decrement the state towards strongly not taken 501, and branches evaluated as taken increment the state towards strongly taken 504. The advantage of the two-bit counter over a one-bit scheme is that a conditional jump has to deviate twice from what it has done most in the past before the prediction changes. For example, a loop-closing conditional jump is mispredicted once rather than twice.

Figure 16:
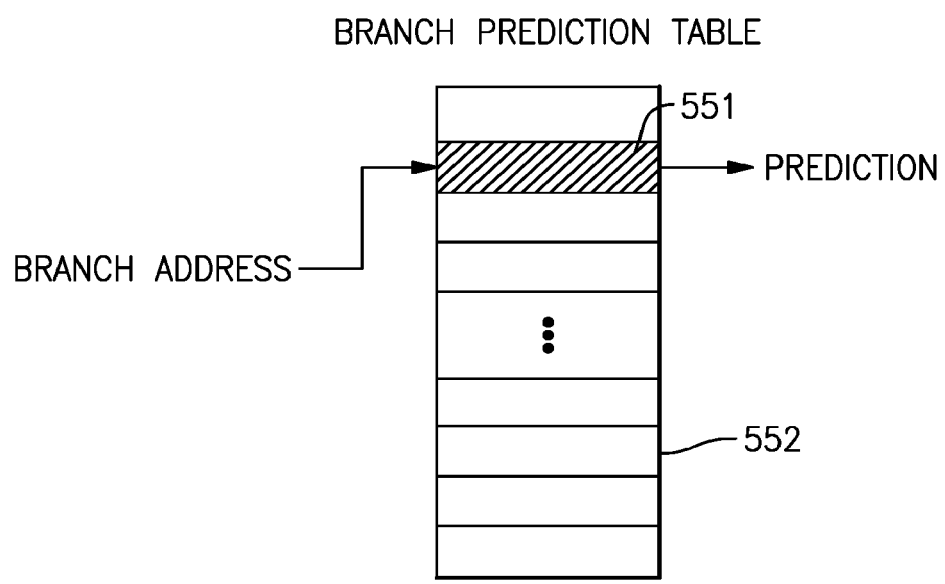
FIG. 16 depicts an exemplary branch predictor.

FIG. 16 illustrates an example implementation of a branch predictor. The branch prediction may be stored in a branch predictor table 551, the predictor table 551 may be indexed with the instruction address bits to locate a prediction entry 552. The advantage of this implementation is that the processor can fetch a prediction for every instruction before the instruction is decoded, and provide a branch prediction before even the branch instruction is decoded.

Figure 6:
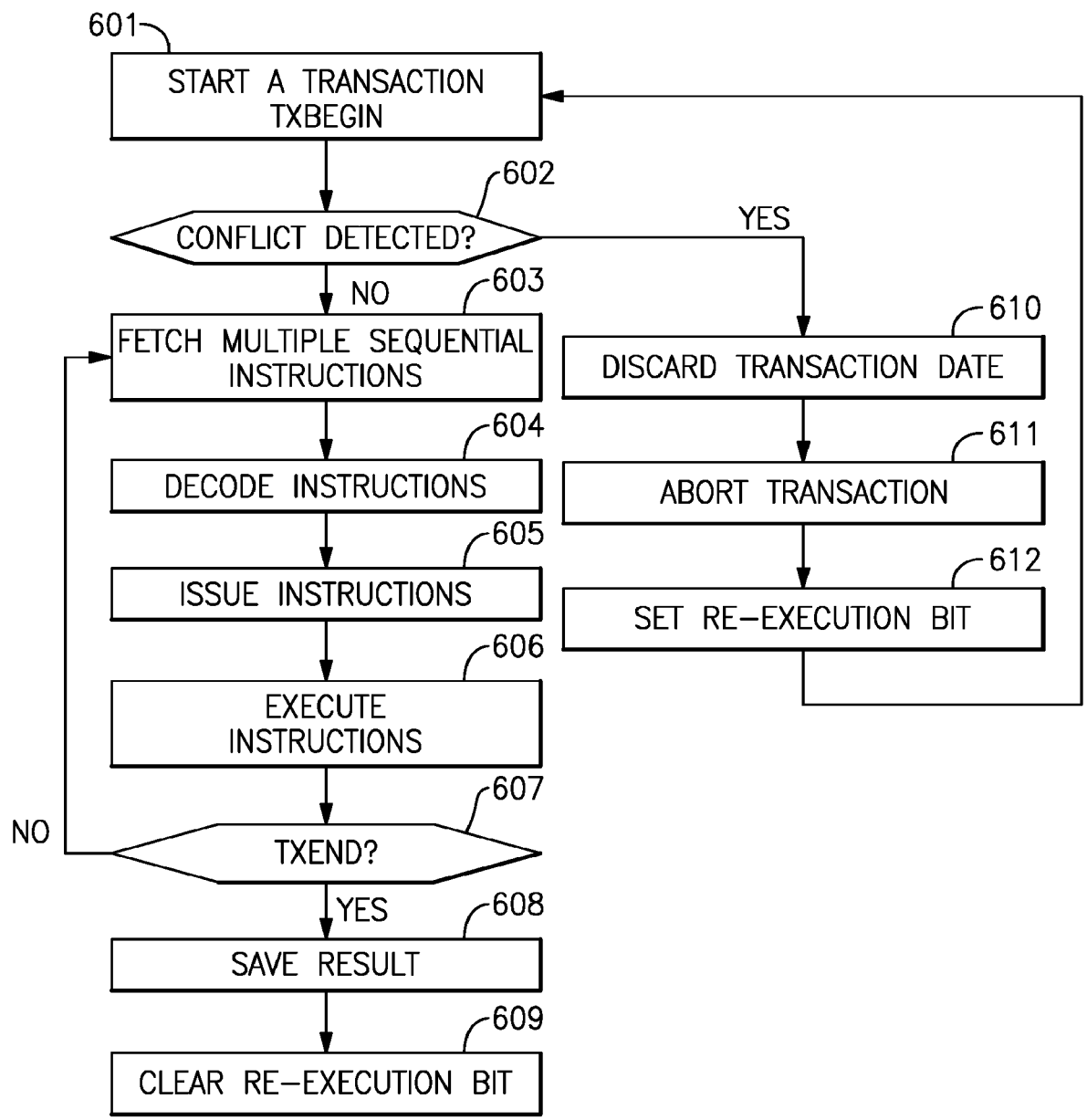
FIG. 6 depicts an example flow of a transaction.

FIG. 6 describes a control flow describing an example of how a processor identifies that it is in a transactional re-execution. This control flow describes constrained transactions, wherein an aborted transaction will be immediately re-executed on the same processor core. When the instruction TXBEGIN is issued and executed, a status bit indicating a transactional execution is in progress is set. In one embodiment, instruction TXBEGIN 601 may be used to indicate start of a transactional execution. In another embodiment, the instruction indicating the beginning of a transaction may be XBEGIN 601. Other instructions indicating the beginning 601 of transactional execution can be used without departing from the scope of invention.

The execution proceeds to instruction fetch and decode in the transaction mode. The execution proceeds in accordance with the transaction mode. As long as no transaction conflict 602 is detected, multiple sequential instructions are fetched 603, decoded 604, issued 605 and executed 606, and the transactional execution proceeds. The transaction's read and write sets are recorded, and results are buffered until a transaction is committed, or discarded if the transaction aborts.

When the instruction XEND 607 is fetched and decoded, this may be the indicator that the transaction reached its end, and if no conflicts 602 are detected, and the results from this transaction can be committed. If the transaction is to be committed, execution proceeds to saving 608 the results of the transaction to the memory. Upon saving 608 the results, the status bit indicating transaction re-execution is cleared 609, independently of its previous state.

If the transaction, however, detects 602 a conflict, and the transaction needs to be aborted 611, the steps of transaction aborting are taken to discard transaction data 610, including, for example, all calculated buffered data are cleared, and transaction's read and write data sets are cleared. The sticky transaction re-execution bit may be set 612, to indicate that this transaction was aborted 611.

The system restarts the transaction from the beginning of the transaction with the TXBEGIN instruction 601 in one embodiment. In another embodiment, a re-executed transaction may be started by hardware without re-executing the aborted TXBEGIN 601.

Figure 7:
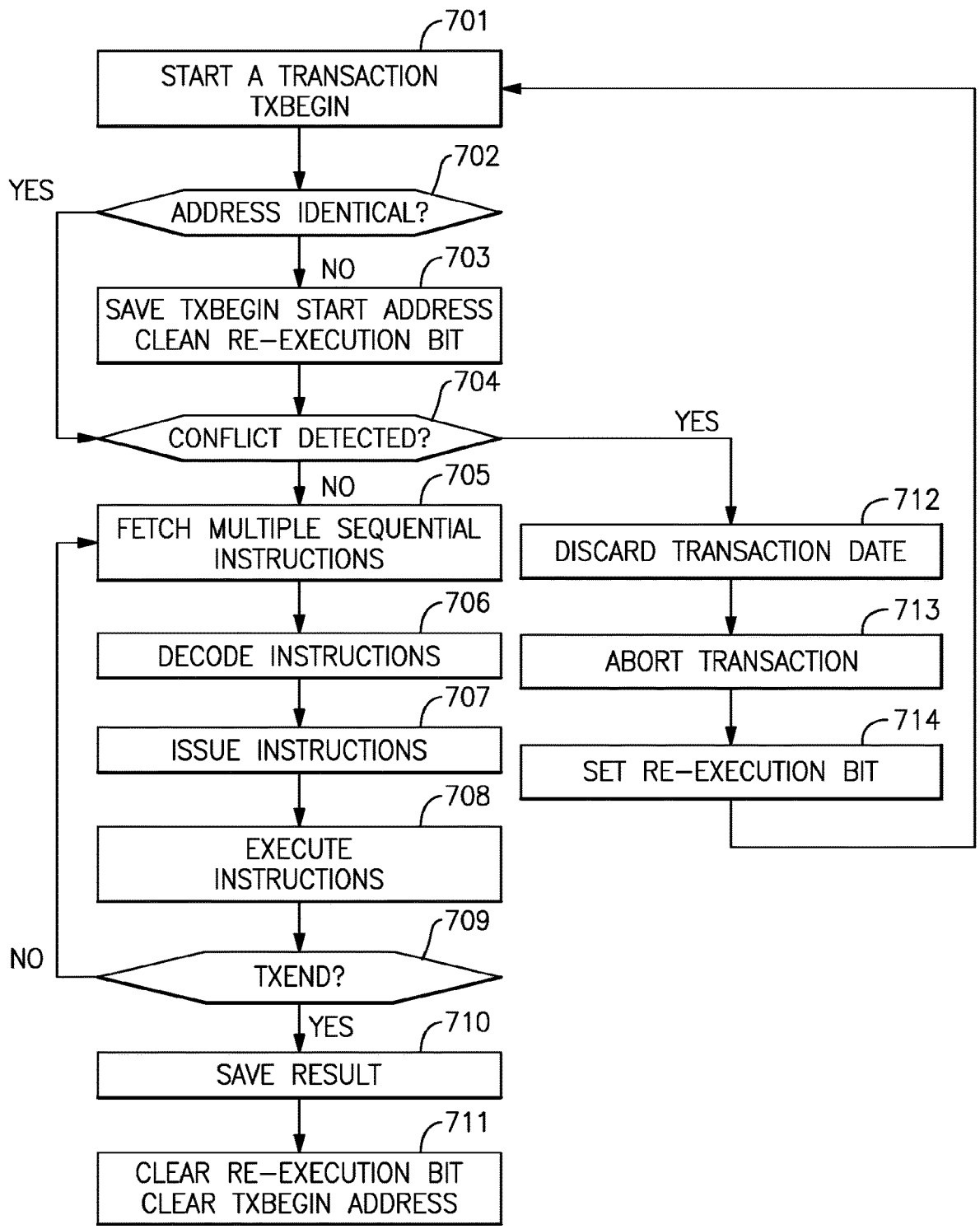
FIG. 7 depicts an example flow for transaction re-execution.

FIG. 7 describes a control flow for another example embodiment. In addition to sticky re-execute bit, the address of the TXBEGIN instruction may be kept in a sticky register. This embodiment is advantageous for unconstrained transactions initiated by a user code that have a choice to re-execute a transaction or not. If 702 the new transaction starts 701 at the same memory address as the saved TXBEGIN address, the processor executes the same transaction, and the re-execute sticky bit indicates that this may be the repeated transaction. If 702, however, the current TXBEGIN instruction may be loaded from a different address than the address stored in the sticky address register, this is a different transaction, which causes the TXBEGIN start address of the current TXBEGIN instruction to be saved 703 and the re-execution bit is cleared 703. As long as no conflict is detected 704, the transaction proceeds to fetch 705 one or more sequential instructions, decode 706 the fetched instructions, issue 707 the decoded instructions and execute 707 the issued instructions until a TXEND is encountered 709 or a conflict is detected 704. When the TXEND is executed, buffered results are saved 710 (committed to memory) and the TXBEGIN saved address is cleared 711 and the re-execution bit, if set, is cleared 711. On the other hand, if a conflict is detected 704 buffered transaction data is discarded 712, the transaction aborts 713 and the re-execution bit is set 714.

Figure 9:
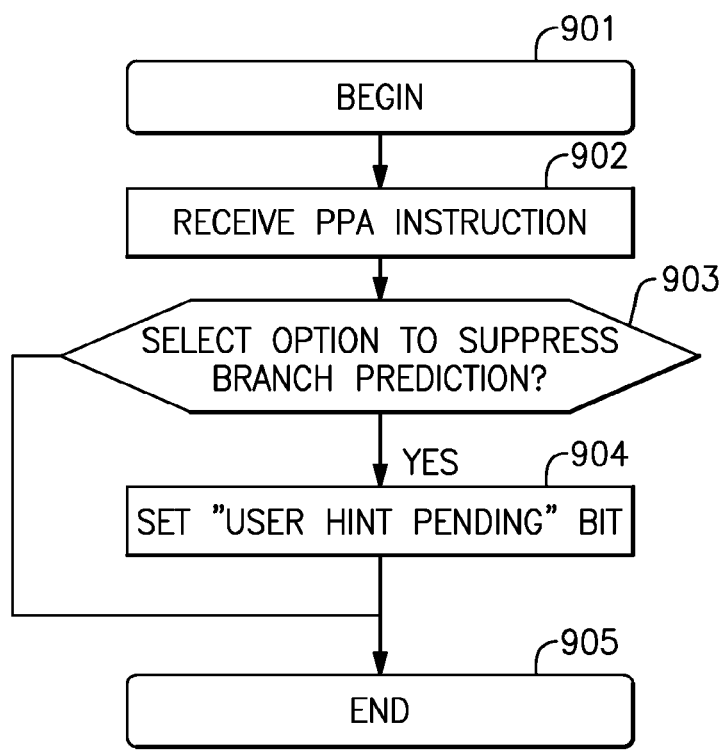
FIG. 9 illustrates an example hint setting instruction flow.

FIG. 9 illustrates yet another example embodiment. This embodiment allows setting up a user hint bit 904 to communicate to hardware that this transaction was previously aborted, and needs to be executed in a conservative, branch prediction disabled mode. To begin with 901, a user set hint instruction may be received 902 and used to provide hints and set status and configuration bits in hardware. In one embodiment, hint instruction is PPA (Perform Processor Assist) instruction.

In an embodiment, issuing a PPA instruction 902 indicates that branch prediction needs to be suppressed 903. In another embodiment, a PPA instruction 902 has operands, and one of these operands can indicate 903 that branch prediction needs to be disabled. When the PPA instruction 902 is executed, the option to suppress branch prediction, if any, 903 causes 904 a "user hint pending" field to be set. The user hint pending field may be a single bit (suppress branch prediction) or may indicate a plurality of branch prediction functions to be suppressed.

In at least one embodiment user program issues a PPA instruction 902 to suppress 903 branch prediction after a transaction has failed. In another embodiment, the PPA instruction is issued after a transaction has failed N times. In yet another embodiment, user program issues a PPA instruction to suppress branch prediction based on application profiling, JIT compilation parameters, user preferences, or any other information about workloads or transaction information obtained at problem development, compile or run time is used to set a PPA instruction to disable branch prediction functionality.

Figure 8:
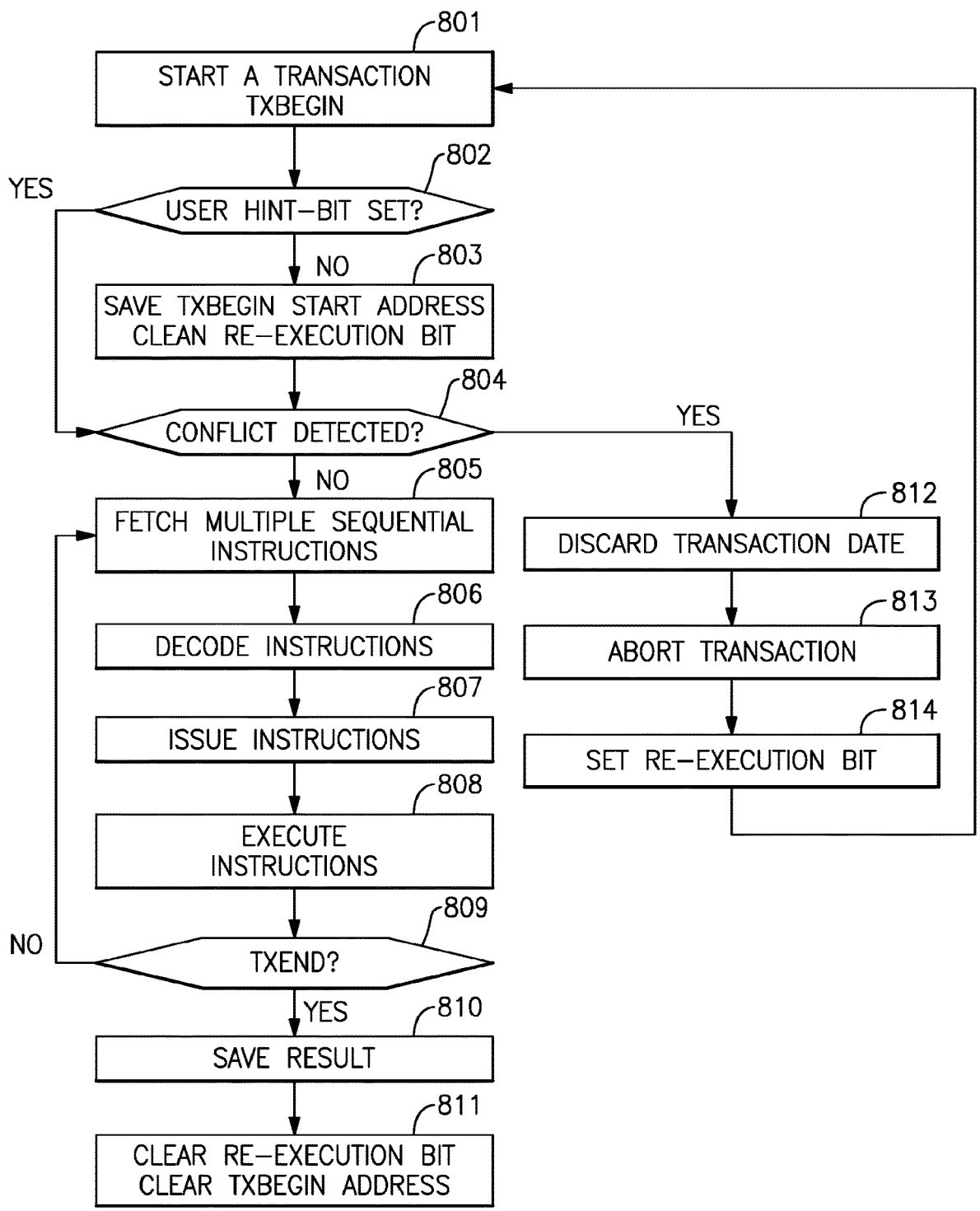
FIG. 8 illustrates an example flow of a transaction.

FIG. 8 depicts a control flow for another embodiment using the PPA hint instruction to set re-execute bit. A transaction may be started (801) by, for example, executing a TXBEGIN instruction. A test of the user hint-set bit(s) is done 802, and if it provides a hint that the transaction is not a re-execution of an aborted transaction the address of the TXBEGIN start address is saved 803 and any re-execution indicator may be cleaned (reset) 803. As long as not conflict is detected 804, the transaction continues to fetch one or more sequential instructions 805, decode the fetched instructions 806, issue the decoded instructions 807, and execute the issued instructions 808 until a TXEND is encountered 809 or a conflict is detected 804. If a conflict is detected 804, buffered transaction data is discarded 812, the transaction is aborted 813 and the re-execution bit is set 814 (if not already set).

If the TXEND is encountered 809, the buffered transaction result data may be saved 810 (committed to memory), any re-execution bit(s) are cleared (reset) 811 and the saved TXBEGIN address is cleared 811.

Figure 10:
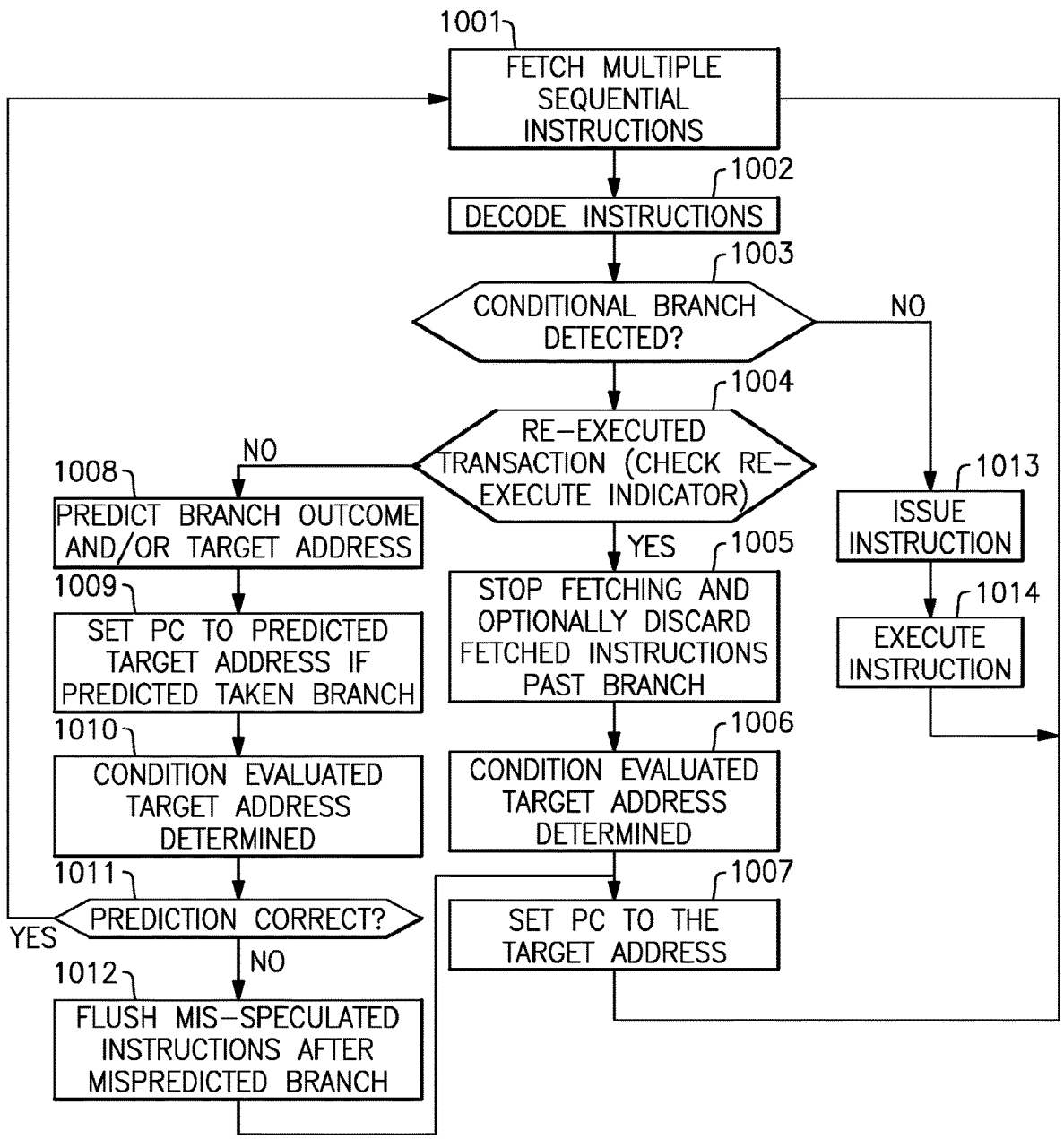
FIG. 10 illustrates an example transaction flow with re-execution option.
Figure 11:
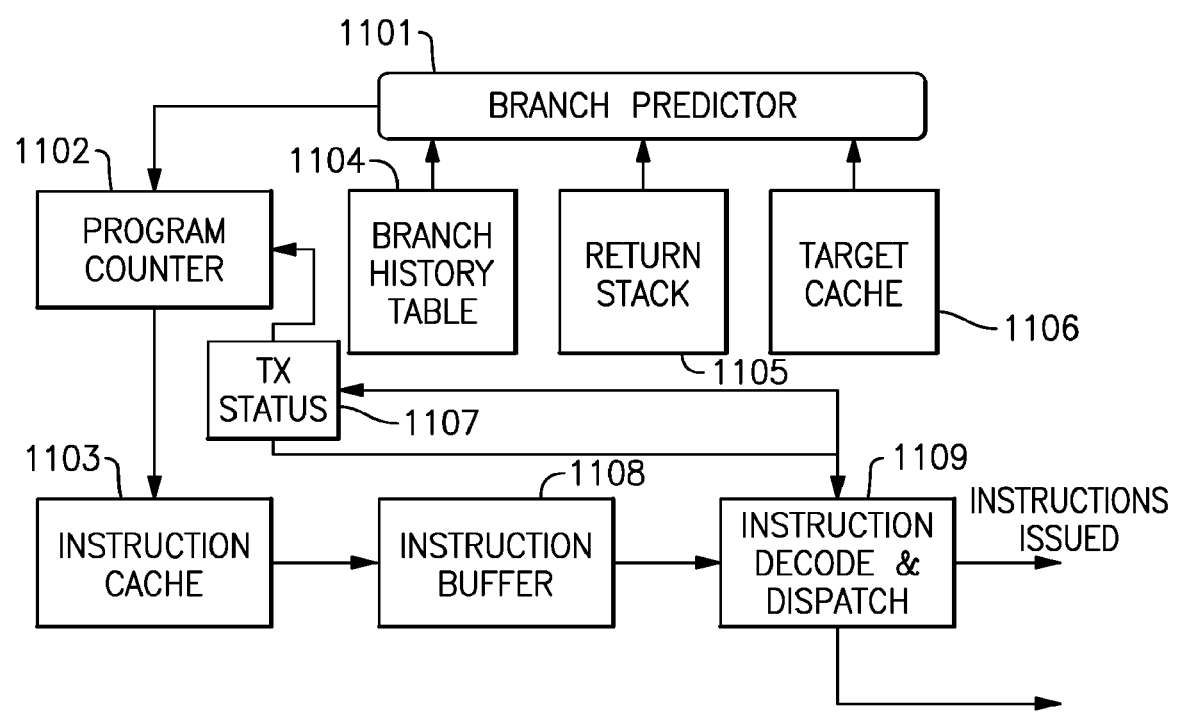
FIG. 11 depicts example components of a branch predictor.

FIG. 10 depicts control flow of the operation of the branch predictor within and outside of a re-executed transaction. Multiple instructions are sequentially fetched 1001 and decoded 1002. If 1003 a conditional branch (jump) instruction in the set of fetched instructions is detected, behavior will differ, depending on if 1004 the processor core is in transactional re-execution state or not. If 1004 the core is not in the transactional re-execution mode, the branch prediction functionality may be used 1008. The branch predictor may determine if the branch will be taken or not taken 1008. If the branch is predicted taken, its target address will be predicted, and the PC (program counter) will be set 1009 to the predicted target address. The program execution will continue by fetching and executing instructions from the predicted target address.

While the program execution continues from the predicted target address, eventually the branch condition is evaluated and its target address is calculated. If 1011 the prediction was correct that the branch is taken or not, and if 1011 the predicted target address is identical to the calculated target address, no changes will be done to the execution of the program, since correct instructions are already fetched and in execution. If 1011, however, the evaluated condition differs from the predicted outcome, this means that the branch was mis-predicted. The speculative execution of instructions which were fetched after mis-speculated branch instruction is discarded (flushed from the pipe-line) 1012, the program counter (PC) is set to the target address 1007 and the correct instructions from the target address are fetched 1101.

Getting back to the determination of the execution mode, if 1004 the core is in the transaction re-execution, upon detection of a conditional branch instruction, the branch prediction functionality will not be used 0051. Instead, the execution pipeline may be stalled until the branch condition is evaluated and the target address is calculated 1006. Then the actual target address is set in the PC 1007. No branch prediction function 1008 will be used, and any output from the branch predictor will be ignored, or alternatively, the branch predictor is disabled. Fetching of further instructions will be stopped until the branch condition is evaluated 1006. If the branch condition is evaluated that the branch will not be taken, the PC will already have the correct value pointing to the next sequential address, and the fetching 1001 a number of instructions, and their decoding and dispatching will continue. If the branch condition is evaluated that the branch is taken, the PC is set 1007 to the determined target address. The program execution will continue by fetching and executing instructions from the target address.

The PC (program counter) 1102 indicates the next sequential address (NSI) or target address from which the next set of instructions is going to be fetched. The instructions are fetched from the Instruction cache 1103, and are buffered 1108 to the instruction buffer 1108. After that, the instructions are decoded 1109, and distributed 1109 (issued) for execution. When a branch instruction is encountered, the pipeline of speculatively executed instructions following the branch may be flushed from the pipeline due to a misprediction while the TX status bit is not set.

The register TX status 1107 contains the operation mode indication of this processor core. If it is set to the TX execution, it means that the processor core is in the transactional execution mode. In an embodiment a separate TX status bit is included in the TX status register 1107 for use in suspending prediction. Once the transaction start instruction is decoded and identified, such as TXBEGIN, in one embodiment, this status 1107 is set to indicate transactional execution. If the instruction TXEND is detected in the instruction decoder, this status bit will be reset to indicate a normal, non-transactional execution.

The branch predictor 1101 may include branch history table 1104 that maintains history of previous occurrences of branch instructions and tags indicating addresses of the previous branch instructions. A PC address 1102 is used to search the table 1104 for previous branch instruction information for branch instructions at the corresponding PC address. A return stack 1105 may maintain information for predicting return addresses from, for example, branch and return instructions. A target cache 1106 may maintain history of previous target instructions.

If the TX status 1107 indicates normal execution, and a conditional branch instruction is detected, a branch instruction triggers checking of the prediction buffer 1109 for example, to predict if the branch will be taken or the execution will fall through and continue on its current path. The output from the branch predictor 1101 is enabled in this mode, and depending on the prediction, the new predicted target address is updated to the PC, if predicted taken, or is left unchanged, if predicted not taken. If at a later point it is determined that the branch is mispredicted, the speculatively issued instructions following the predicted branch will be flushed.

If the TX status 1107 indicates transactional execution, and a conditional branch instruction is detected, a branch prediction output into the PC 1102 will be ignored. Preferably no further instructions will be fetched and decoded until the branch is correctly evaluated. Once the branch is evaluated, if it is not taken, the PC value will stay unchanged. If the branch evaluation indicates that the branch is taken, the calculated target address is loaded in the PC. The transaction execution proceeds by fetching the new set of instructions from the address in the PC 1102, then buffering 1108, and decoding 1109 and issuing.

In an embodiment, control of suspending branch prediction is accomplished by a suspend branch prediction (SBP) instruction. The SBP instruction may comprise a TXBEGIN instruction and a TXEND instruction, wherein suspension of branch prediction may be begun and ended with the transaction. In another embodiment the SBP instruction may be independent of the Transaction and may cause suspension of branch prediction to begin or end, within a transaction or outside of a transaction, depending on where the SBP is executed. In an embodiment the SBP instruction sets and resets a Suppress Prediction mode bit that is separate from the TX Mode bit set and reset by TXBEGIN and TXEND respectively. In another embodiment, SBP may only suspend prediction within a transaction.

Figure 15:
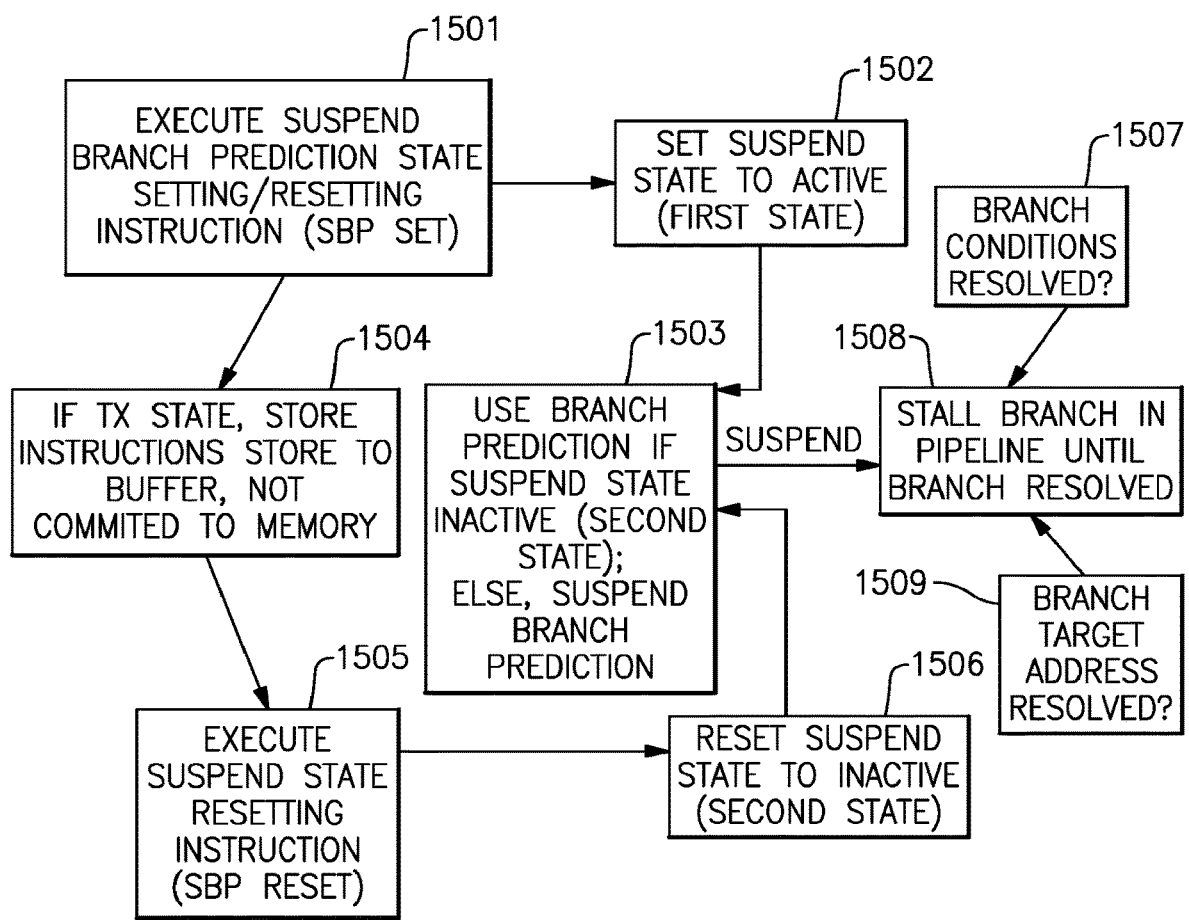
FIG. 15 is a flow depicting function of a suspend branch prediction (SBP) instruction.

Referring to FIG. 15, a Suspend Branch Prediction (SBP) instruction is executed 1501, that sets 1502 the Suspend state to active (a first state), causing subsequent branch instructions to suspend branch prediction until a second SBP instruction is executed 1505, the second SBP instruction configured to reset the suspend state 1506 to an inactive state (second state). If 1504, a transaction is executing in the suspend state, store instructions store 1504 to buffer until the transaction ends. While the suspend state is set, use 1503 of branch prediction is suspended, and only resumed after the suspend state is reset. In an embodiment, branches may stall 1508 when unresolved 1507 in the pipeline while branch prediction is suspended until branch target address is resolved 1509.

In an embodiment, SBP instructions are used for various software recovery methods, for example, to suppress branch predictions on a re-execution of a transaction, to suppress predictor updates on re-execution, to gather predictor updates into a FIFO branch prediction buffer on re-execution, to flush a predictor FIFO branch prediction buffer on a transaction abort, to commit a FIFO branch prediction buffer information to the branch predictor or when the corresponding transaction completes. In an embodiment, the SBP reset instruction causes a write of the FIFO branch prediction buffer information to be writtend to the predictor.

A programmer may always enable manual management of prediction updates with SBP instructions for transaction execution, or the programmer may enable such management as part of a recovery function, responsive to a transaction abort event. A programmer may use forms of the SBP instructions to collect program statistics, runtime instrumentation, profile collection. The programmer (or a compiler, just-in-time (JIT) run-time handler, dynamic compiler, dynamic optimizer, an operating system (OS), a Hypervisor) will use SBP to perform these functions.

In some embodiments, programmers will disable and enable branch prediction suppression for transactions using the SBP set instructions, in a transaction or outside of a transaction. The SBP instruction may include information for selecting various elements of branch prediction for suspension. For example in one option, only using the predictor may be suspended, in another option, updating the predictor may be suspended, in another option only prediction for specified branch types may be suspended. In another option, specific types of prediction are suspended, i.e branch target prediction, branch history prediction, branch condition outcome prediction etc.

Figure 12:
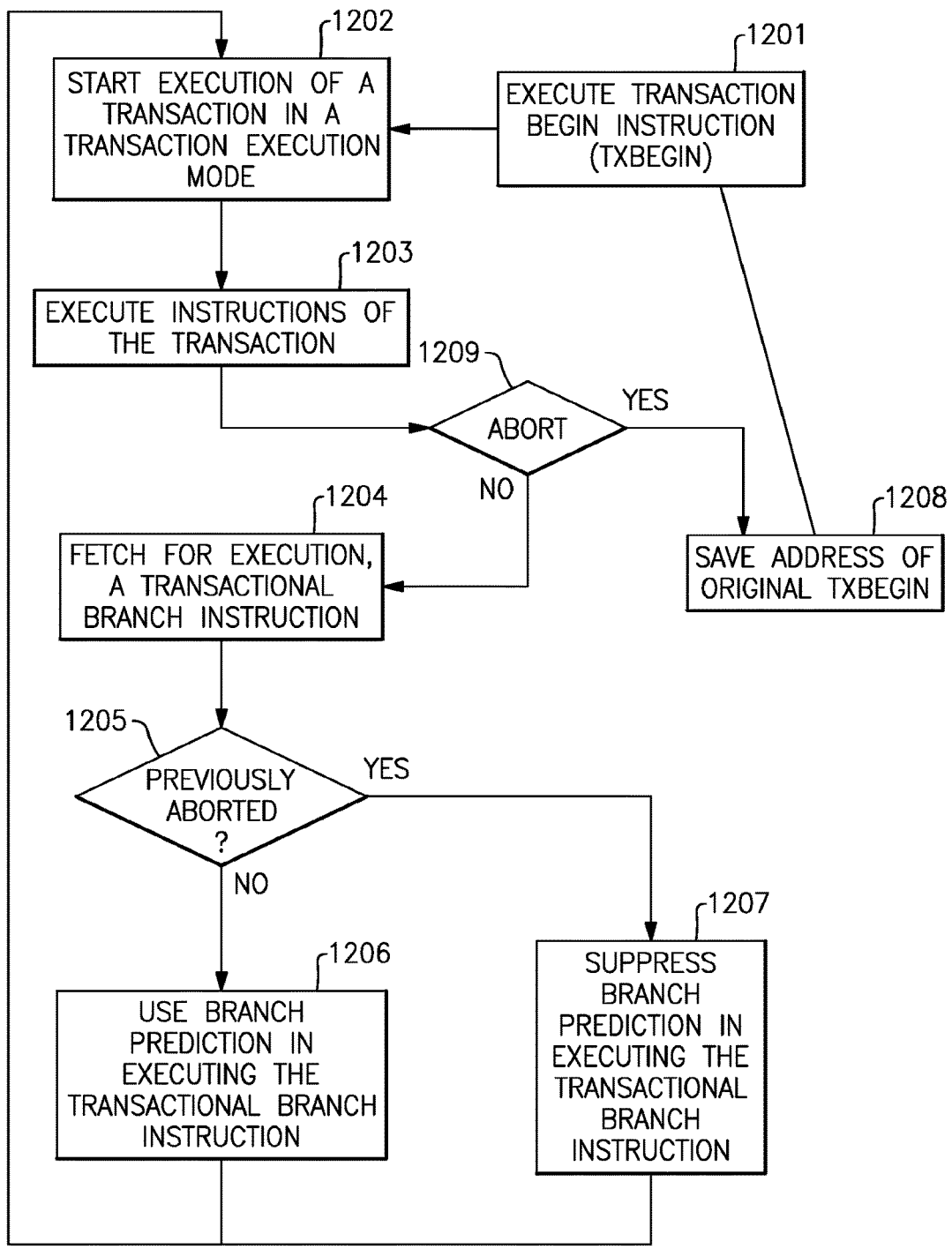
FIG. 12 illustrates a flow of an example branch prediction suppression.

Referring to FIG. 12, in an embodiment, branch prediction may be suppressed for branch instructions executing in a transaction of a transactional memory (TM) environment, in a computer system comprising: a memory, and a processor in communications with the memory the processor comprising branch prediction facilities. Execution of a transaction may be started 1202 in a transaction execution mode, the transaction may be started 1202 based on execution of a transaction begin instruction (TXBEGIN) 1201. Instructions of the transaction are executed 1203 and transactional branch instructions are fetched for execution 1204. A determination is made 1205 as to whether the started transaction was previously aborted and based on the transaction being previously aborted 1205, branch prediction may be suppressed 1207 in executing the transactional branch instruction, otherwise branch prediction may be used 1206

Figure 17:
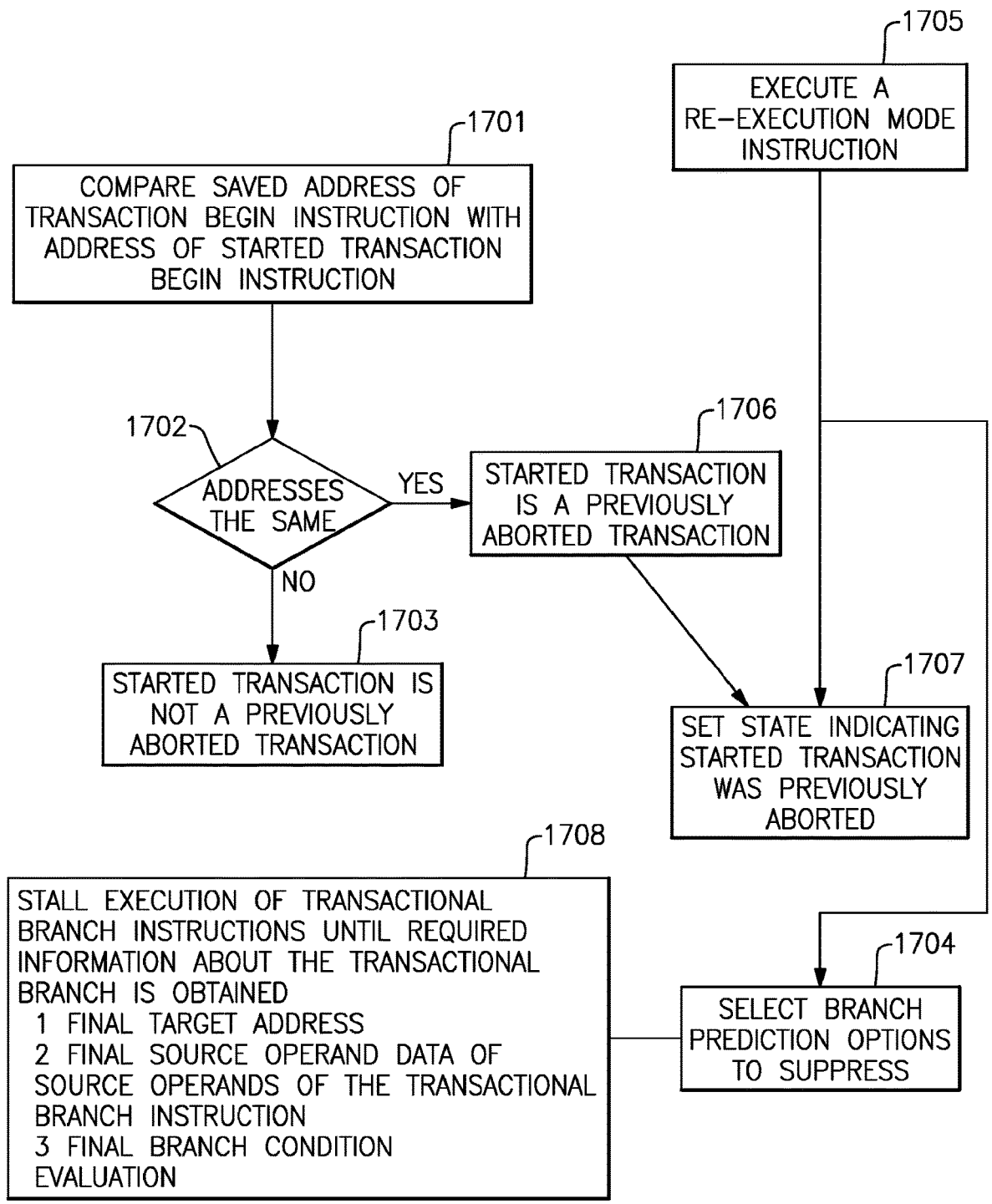
FIG. 17 depicts an example flow of a transaction suspension.

In an embodiment, a transaction begin instruction may be executed 1201 to start execution 1202 of the transaction, an address of a transaction begin instruction may be saved 1208 based on the transaction being aborted 1209, wherein, referring to FIG. 17, the determining further comprises comparing 1701 a transaction begin instruction address of the started transaction with the saved address of a transaction begin instruction, wherein the started transaction is determined to be previously aborted 1706 based on the compare being equal 1702, otherwise 1703 the started transaction is not a previously aborted transaction.

In an embodiment, a re-execution mode instruction may be executed 1705, the executing setting a state 1707 indicating that the started transaction is a previously aborted transaction; and the state is used to determine 1205 the started transaction was a previously aborted transaction. In another embodiment, the re-execution mode instruction is executed 1705 to set branch prediction options to suppress 1704

In an embodiment, the determining causes a state to be set 1707 and transactional branch instructions are executed in the transactional execution mode using branch prediction 1206, based on the set state being in a first state; and the transactional branch instructions are executed in the transactional execution mode with branch prediction being suppressed, based on the set state being in a second state.

In an embodiment, the suppressing 1708 comprises stalling execution of the transactional branch instructions until required information about the transactional branch instruction may be obtained.

In an embodiment, the required information comprises 1708 a final target address.

In an embodiment, the required information comprises 1708 final source operand data of source operands of the transactional branch instruction.

In an embodiment, the required information comprises 1708 final branch condition evaluation.

In yet a further embodiment, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers Network adapters may also be coupled to the system to enable the data processing system to become coupled to other data processing systems or remote printers or storage devices through intervening private or public networks. Modems, cable modems, and Ethernet cards are just a few of the available types of network adapters.

One or more of the capabilities of the present invention can be implemented in software, firmware, hardware, or some combination thereof. Further, one or more of the capabilities can be emulated.

One or more aspects of the present invention can be included in an article of manufacture (e.g., one or more computer program products) having, for instance, computer readable storage media 11. The media has embodied therein, for instance, computer readable program code (instructions) to provide and facilitate the capabilities of the present invention. The article of manufacture can be included as a part of a computer system or as a separate product.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at a times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example:
- a semi-conductor storage device comprising, for example, a memory array such as a RAM or a memory circuit such as latch having instructions recorded thereon;
- a mechanically encoded device such as punch-cards or raised structures in a groove having instructions recorded thereon;
- an optically readable device such as a CD or DVD having instructions recorded thereon; and
- a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), A sequence of program instructions or a logical assembly of one or more interrelated modules defined by one or more computer readable program code means or logic direct the performance of one or more aspects of the present invention.

Although one or more examples have been provided herein, these are only examples. Many variations are possible without departing from the spirit of the present invention. For instance, processing environments other than the examples provided herein may include and/or benefit from one or more aspects of the present invention. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer-implemented method of suppressing branch prediction for branch instructions executing in a transaction of a transactional memory (TM) environment, the computer-implemented method comprising:
   starting execution of a transaction in a transaction execution mode;
   determining whether the transaction was previously aborted;
   fetching for execution, a transactional branch instruction of the started transaction; and
   using or suppressing branch prediction in executing the transactional branch instruction based on whether the transaction was previously aborted, wherein branch prediction is only used based on the transaction not having been previously aborted and is suppressed based on the transaction having been previously aborted any number of times.

2. The computer-implemented method according to claim 1, further comprising:
   executing a transaction begin instruction to start execution of the transaction; and
   saving an address of a transaction begin instruction based on the transaction being aborted, wherein the determining further comprises comparing a transaction begin instruction address of the started transaction with the saved address of a transaction begin instruction, wherein the started transaction is determined to be previously aborted based on the compare being equal.

3. The computer-implemented method according to claim 1, further comprising:
   executing a re-execution mode instruction, the executing setting a state indicating that the started transaction is a previously aborted transaction; and
   using the state to determine the started transaction was a previously aborted transaction.

4. The computer-implemented method according to claim 1, further comprising:
   the determining the transaction was previously aborted causing a state to be set; and
   executing transactional branch instructions in transactional execution mode using branch prediction, based on the set state being in a first state; and
   executing the transactional branch instructions in the transactional execution mode suppressing branch prediction, based on the set state being in a second state.

5. The computer-implemented method according to claim 1, further comprising:
   the suppressing comprising stalling execution of the transactional branch instructions until required information about the transactional branch instruction is obtained.

6. The computer-implemented method according to claim 5, wherein the required information comprises a final target address.

7. The computer-implemented method according to claim 5, wherein the required information comprises final source operand data of source operands of the transactional branch instruction.

8. The computer-implemented method according to claim 5, wherein the required information comprises final branch condition evaluation.

* * * * *